US012688668B2

(12) United States Patent
Luciano et al.

(10) Patent No.: US 12,688,668 B2
(45) Date of Patent: Jul. 21, 2026

(54) SYSTEMS, DEVICES, AND METHODS FOR SEGMENTATION OF ANATOMICAL IMAGE DATA

(71) Applicant: Augmedics, Inc., Arlington Heights, IL (US)

(72) Inventors: Cristian J. Luciano, San Diego, CA (US); Krzysztof B. Siemionow, Miami, FL (US); Dominik Gawel, Warsaw (PL); Edwing Isaac Mejía Orozco, Warsaw (PL); Milo Janković, Warsaw (PL)

(73) Assignee: Augmedics, Inc., Arlington Heights, IL (US)

( * ) Notice: Subject to any disclaimer, the term of this patent is extended or adjusted under 35 U.S.C. 154(b) by 274 days.

(21) Appl. No.: 18/559,465

(22) PCT Filed: May 12, 2022

(86) PCT No.: PCT/US2022/029000
§ 371 (c)(1),
(2) Date: Nov. 7, 2023

(87) PCT Pub. No.: WO2022/241121
PCT Pub. Date: Nov. 17, 2022

(65) Prior Publication Data
US 2024/0265667 A1 Aug. 8, 2024

Related U.S. Application Data

(60) Provisional application No. 63/187,777, filed on May 12, 2021.

(51) Int. Cl.
*G06V 10/26* (2022.01)
*G06V 10/30* (2022.01)
(Continued)

(52) U.S. Cl.
CPC ........... *G06V 10/26* (2022.01); *G06V 10/764* (2022.01); *G06V 10/774* (2022.01); *G06V 10/82* (2022.01);
(Continued)

(58) Field of Classification Search
CPC .... G06V 10/26; G06V 10/764; G06V 10/774; G06V 10/82; G06V 20/70; G06V 10/30;
(Continued)

(56) References Cited

U.S. PATENT DOCUMENTS

| | | | |
|---|---|---|---|
| 12,211,151 B1 * | 1/2025 | Chiou ................... | G06T 19/003 |
| 2013/0034282 A1 * | 2/2013 | Kaufman ............. | G06T 7/0014 |
| | | | 382/128 |

(Continued)

FOREIGN PATENT DOCUMENTS

| | | |
|---|---|---|
| CN | 110569854 B | 3/2022 |
| JP | 2019217243 A | 12/2019 |
| JP | 2021510585 A | 4/2021 |

OTHER PUBLICATIONS

European Patent Office; Communication pursuant to Article 94(3) EPC issued in 22727645.8 dated Dec. 16, 2025.
(Continued)

*Primary Examiner* — Utpal D Shah
(74) *Attorney, Agent, or Firm* — Dinsmore & Shohl LLP

(57) ABSTRACT

Systems, devices, and methods for segmentation of patient anatomy are described herein. A method can include receiving a three-dimensional (3D) scan volume including a set of images of a 3D region of patient anatomy. The 3D region of patient anatomy can include a set of anatomical structures.
(Continued)

The method can also include generating a set of two-dimensional (2D) radiographs using the 3D scan volume. Each 2D radiograph from the set of 2D radiographs can include 3D image data extracted from the 3D scan volume. The method can also include training a segmentation model to segment 2D radiographs using the set of 2D radiographs to identify one or more anatomical parts of interest.

20 Claims, 23 Drawing Sheets

(51) Int. Cl.

| | | |
|---|---|---|
| *G06V 10/764* | (2022.01) | |
| *G06V 10/774* | (2022.01) | |
| *G06V 10/82* | (2022.01) | |
| *G06V 20/70* | (2022.01) | |

(52) U.S. Cl.
CPC .............. *G06V 20/70* (2022.01); *G06V 10/30* (2022.01); *G06V 2201/03* (2022.01)

(58) Field of Classification Search
CPC ...... G06V 2201/03; G06T 2207/10081; G06T 2207/10088; G06T 2207/10116; G06T 2207/20081; G06T 2207/20084; G06T 2207/30012; G06T 7/174; G06T 7/194; G06T 7/11
See application file for complete search history.

(56) References Cited

U.S. PATENT DOCUMENTS

| | | | | |
|---|---|---|---|---|
| 2018/0259608 | A1* | 9/2018 | Golden .................. | G06N 3/084 |
| 2018/0260997 | A1 | 9/2018 | Petkov et al. | |
| 2019/0239926 | A1* | 8/2019 | Pavlovskaia ....... | A61B 17/1703 |
| 2020/0349699 | A1* | 11/2020 | Shah ...................... | G06T 19/20 |
| 2020/0373013 | A1 | 11/2020 | Cao et al. | |
| 2020/0410687 | A1 | 12/2020 | Siemionow et al. | |
| 2021/0000511 | A1* | 1/2021 | Park ...................... | G06T 7/0012 |
| 2021/0287454 | A1* | 9/2021 | Shah ......................... | G06T 7/11 |
| 2021/0401392 | A1* | 12/2021 | Bengtsson ............. | G16H 30/40 |
| 2022/0392076 | A1* | 12/2022 | Seo .......................... | G06T 17/20 |

OTHER PUBLICATIONS

Dolz Jose et al.: "IVD-Net: Intervertebral Disc Localization and Segmentation in MRI with a Multi-modal UNet", Mar. 14, 2019, Advances in Databases and Information Systems; [Lecture Notes in Computer Science; Lect. Notes Computer], Springer International Publishing, CHAM, pp. 130-143, XP047504571, ISGN: 978-3-319-10403-4.

Huang Jiawei et al: "Spine Explorer: a deep learning based fully automated program for efficient and reliable quantifications of the vertebrae and discs on sagittal lumbar spine MR images", The Spine Journal, Elsevier, Amsterdarm, NL, vol. 20, No. 4,Nov. 20, 2019, pp. 590-599, XP0861154843, ISSN: 1529-9430, DOI: 10.1016/J. SPINEE.2019.11.010.

Notice of Reasons for Refusal issued in Japanese Patent App. No. 2023-570082 dated Feb. 10, 2026.

Notice of Deficiencies issued in Israel Patent Application 308450 dated Feb. 25, 2026.

* cited by examiner

400

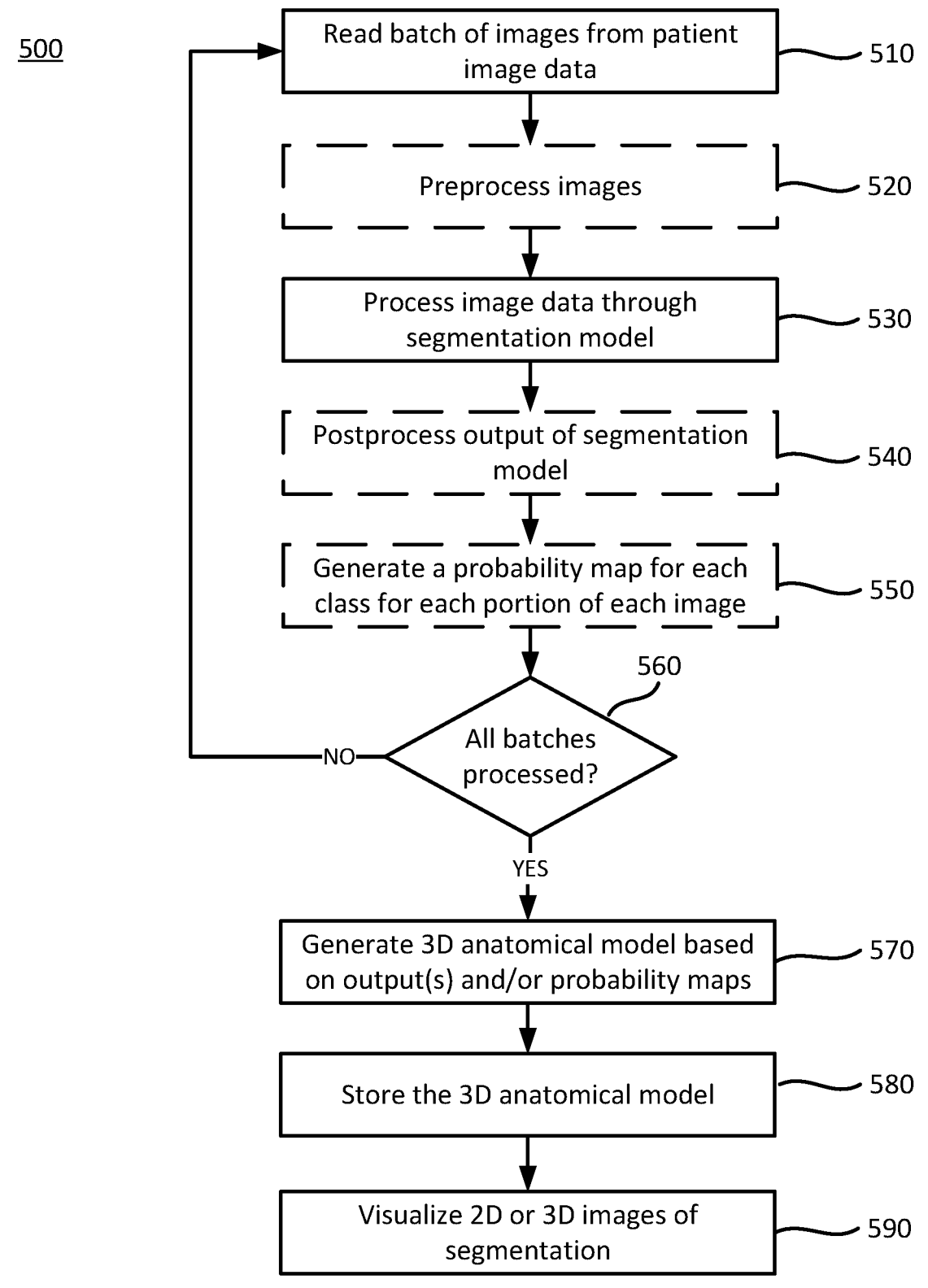

500

Read batch of images from patient image data ~ 510

Preprocess images ~ 520

Process image data through segmentation model ~ 530

Postprocess output of segmentation model ~ 540

Generate a probability map for each class for each portion of each image ~ 550

560

All batches processed?

NO

YES

Generate 3D anatomical model based on output(s) and/or probability maps ~ 570

Store the 3D anatomical model ~ 580

Visualize 2D or 3D images of segmentation ~ 590

FIG. 5

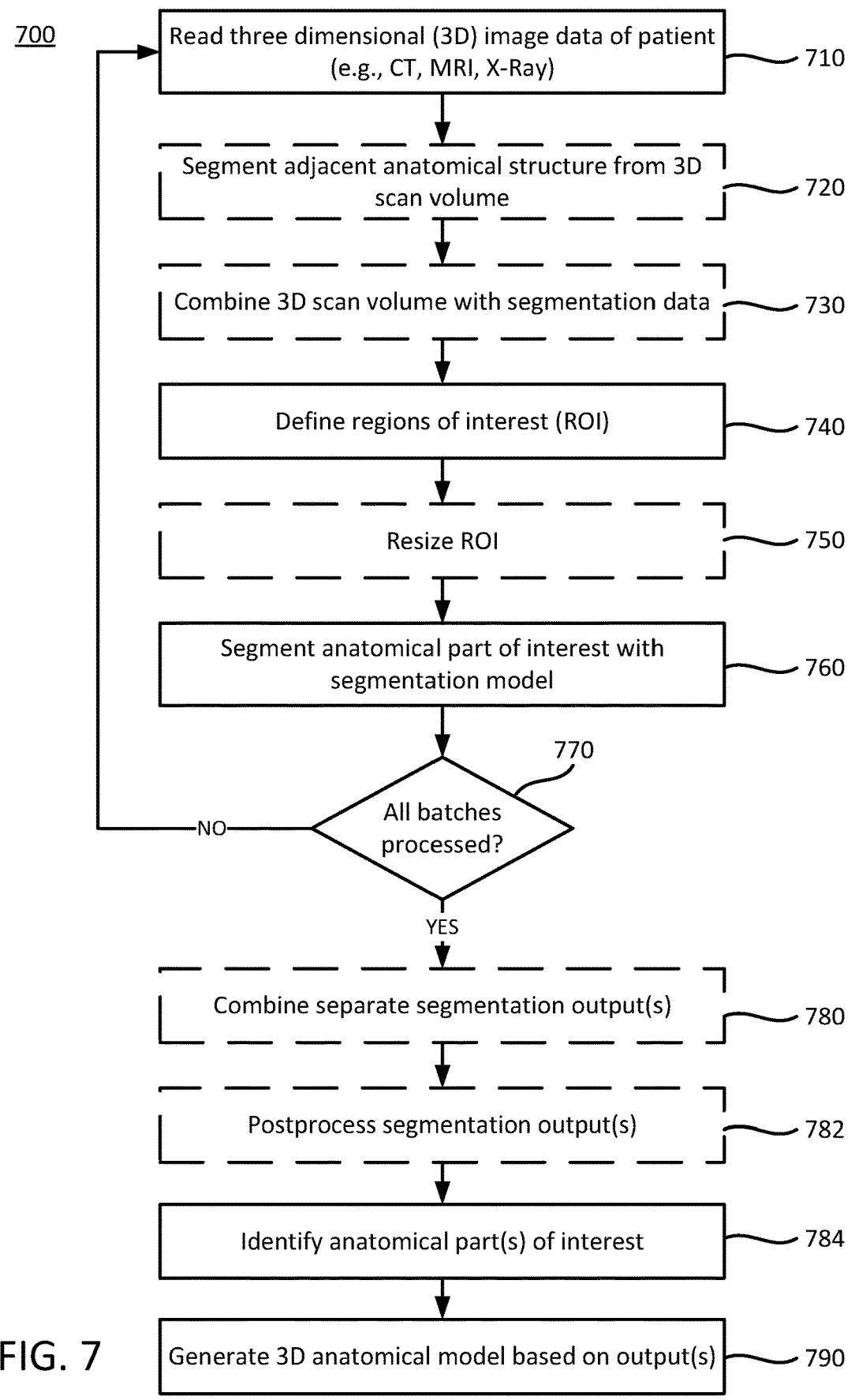

700

Read three dimensional (3D) image data of patient (e.g., CT, MRI, X-Ray) — 710

Segment adjacent anatomical structure from 3D scan volume — 720

Combine 3D scan volume with segmentation data — 730

Define regions of interest (ROI) — 740

Resize ROI — 750

Segment anatomical part of interest with segmentation model — 760

770
All batches processed?

NO

YES

Combine separate segmentation output(s) — 780

Postprocess segmentation output(s) — 782

Identify anatomical part(s) of interest — 784

FIG. 7    Generate 3D anatomical model based on output(s) — 790

800

810

1200

1510
1520
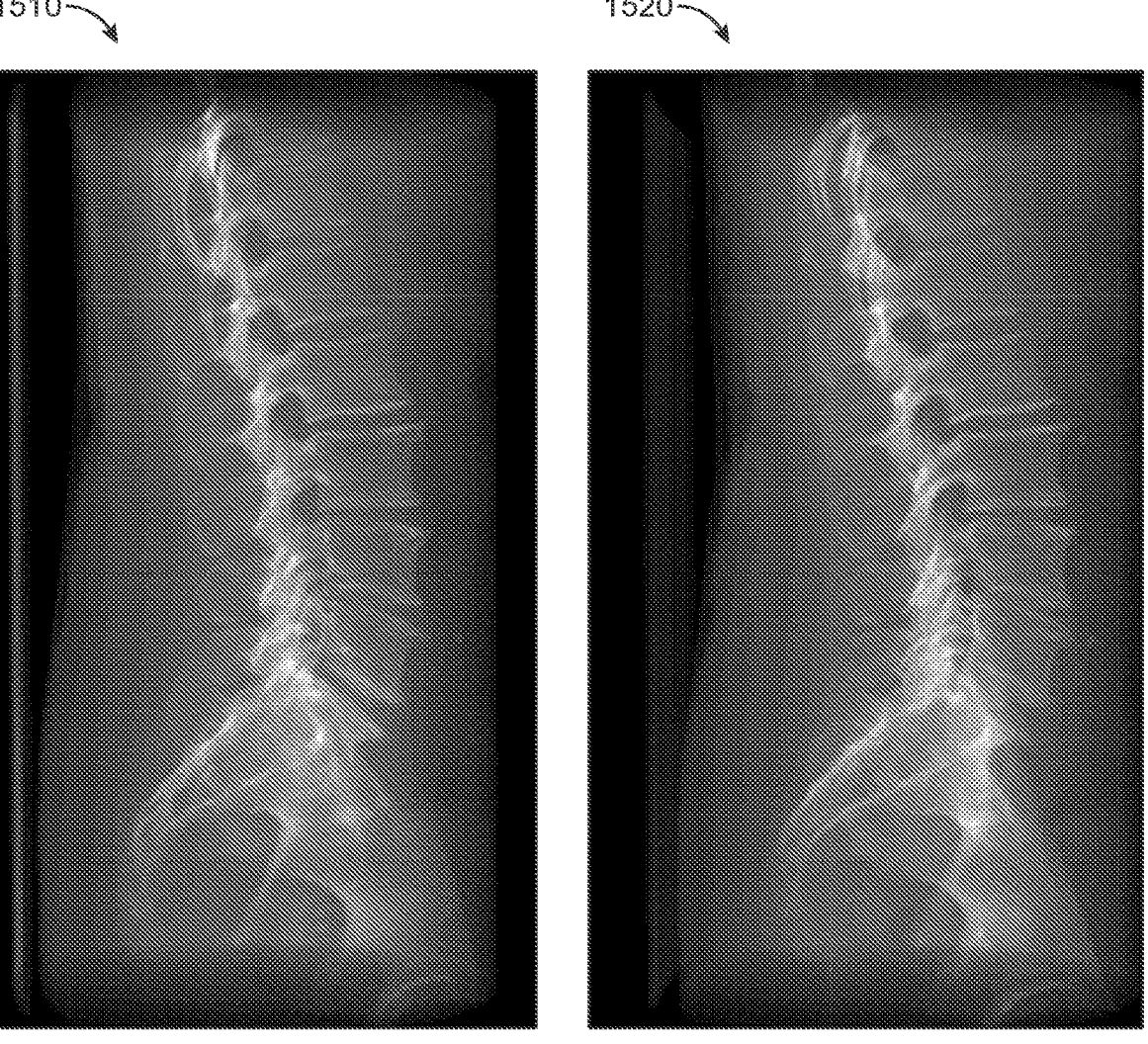
FIG. 15A                          FIG. 15B

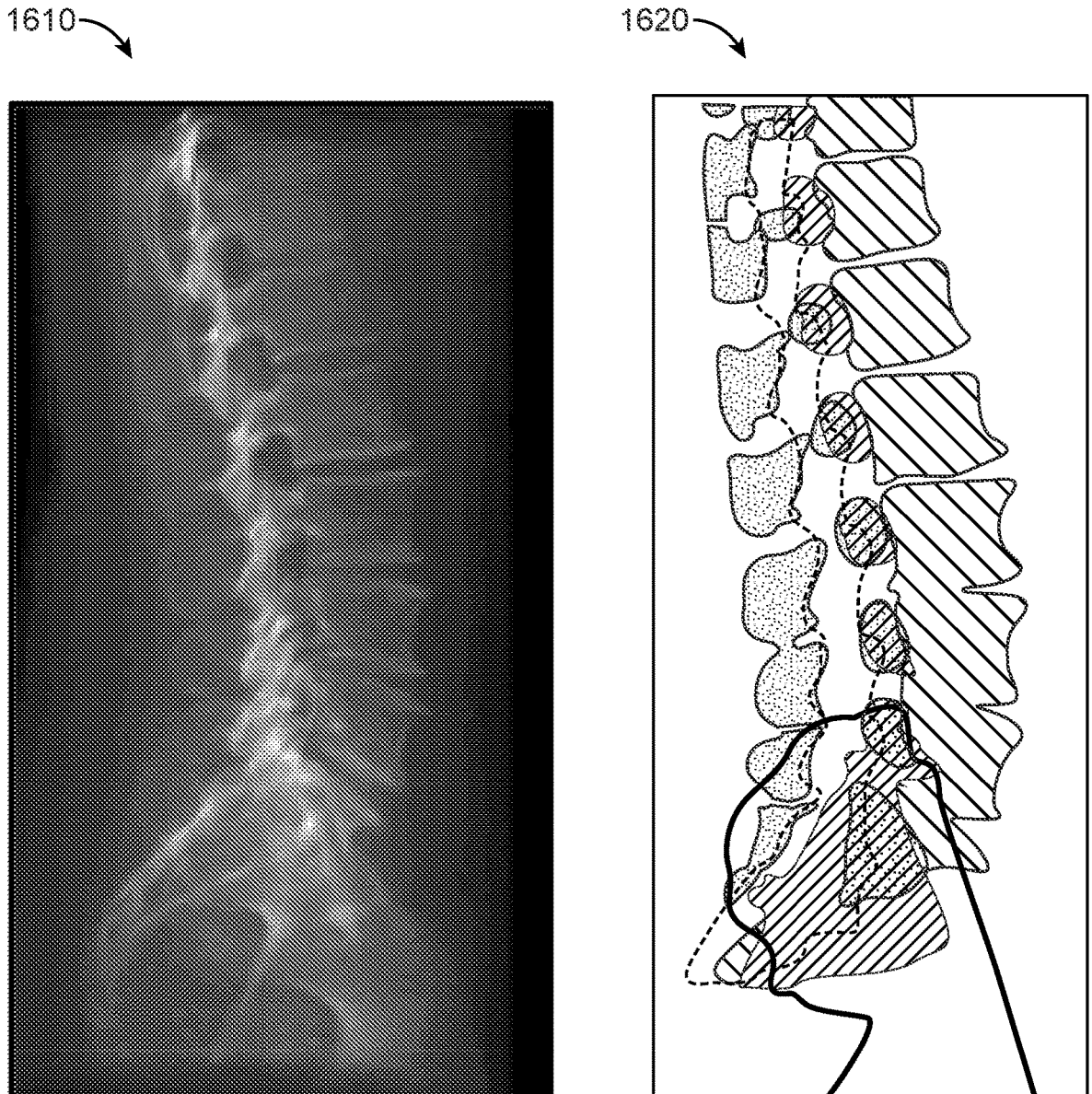
FIG. 16A                    FIG. 16B

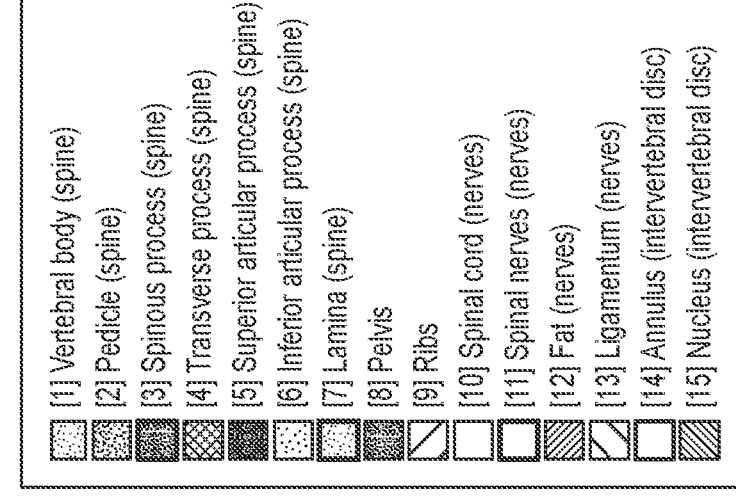
1802
[1] Vertebral body (spine)
[2] Pedicle (spine)
[3] Spinous process (spine)
[4] Transverse process (spine)
[5] Superior articular process (spine)
[6] Inferior articular process (spine)
[7] Lamina (spine)
[8] Pelvis
[9] Ribs
[10] Spinal cord (nerves)
[11] Spinal nerves (nerves)
[12] Fat (nerves)
[13] Ligamentum (nerves)
[14] Annulus (intervertebral disc)
[15] Nucleus (intervertebral disc)
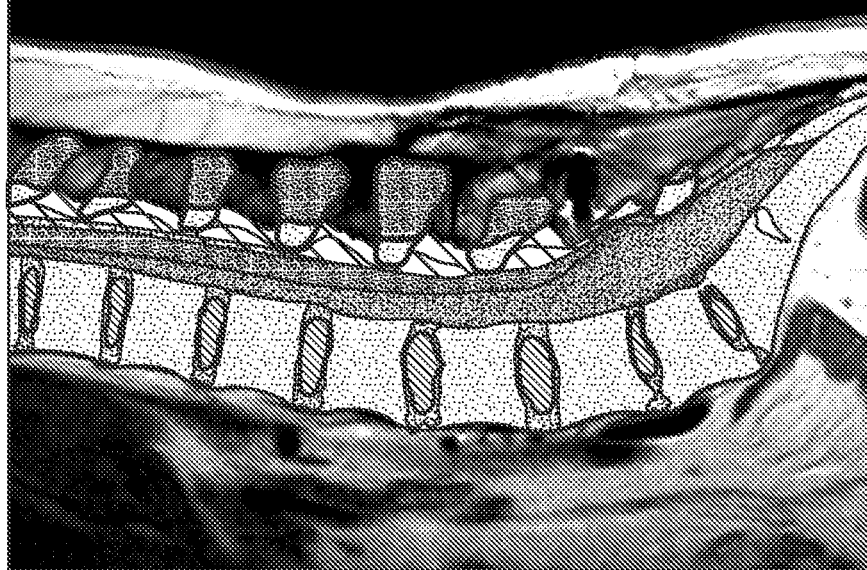
1812
FIG. 18B
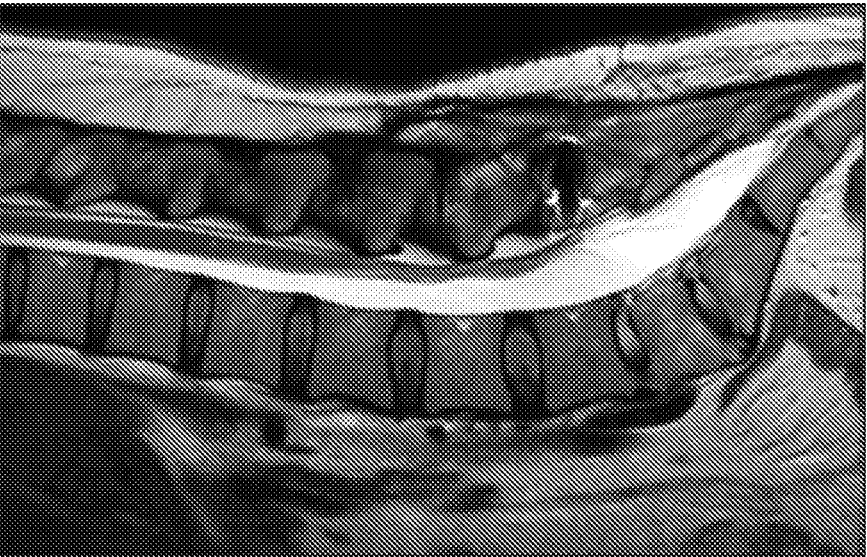
1810
FIG. 18A

1802

[1] Vertebral body (spine)
[2] Pedicle (spine)
[3] Spinous process (spine)
[4] Transverse process (spine)
[5] Superior articular process (spine)
[6] Inferior articular process (spine)
[7] Lamina (spine)
[8] Pelvis
[9] Ribs
[10] Spinal cord (nerves)
[11] Spinal nerves (nerves)
[12] Fat (nerves)
[13] Ligamentum (nerves)
[14] Annulus (intervertebral disc)
[15] Nucleus (intervertebral disc)

1822

1820

1830

1832

SYSTEMS, DEVICES, AND METHODS FOR SEGMENTATION OF ANATOMICAL IMAGE DATA

CROSS-REFERENCE TO RELATED APPLICATIONS

This application claims the benefit of U.S. Provisional Application No. 63/187,777, filed May 12, 2021, the content of which is hereby incorporated by reference in its entirety.

TECHNICAL FIELD

The present disclosure relates generally to systems, devices, and methods for segmenting anatomical image data, and specifically relates to segmentation of three-dimensional (3D) anatomical images using machine learning models.

BACKGROUND

Image-guided or computer-assisted surgery can be used to assist physicians in navigating to and/or operating on a target area of interest during a surgical procedure. Systems and devices implementing image-guided surgery can use image data of patient anatomy and tracking data associated with the patient anatomy and/or surgical tools and implants to provide guidance to a physician during a surgical operation. Image-guided surgery can use image data of patient anatomy acquired through one or more imaging systems, including, for example, computed tomography (CT), magnetic resonance imaging (MRI), X-ray, ultrasound, and fluoroscopy systems. Various medical diagnoses can also be performed by interpreting medical images obtained from one or more imaging systems.

Traditional X-ray and CT are common methods for acquiring information of patient anatomy, including, for example, a spine of the patient. Traditional X-rays involve directing high-energy electromagnetic radiation at a patient's body, and capturing a resulting two-dimensional (2D) X-ray profile on a film or plate. X-ray imaging, however, can subject patients to high levels of radiation. Analysis of X-rays can also be subjective based on physician training and experience. Currently, these is no autonomous way to objectively analyze X-rays. Accordingly, performing necessary measurement on X-rays requires time and can be subject to user error. Lack of autonomous methods of analyzing X-rays also makes it difficult to objectively compare a patient's X-rays over time, e.g., to track a patient's progress. Due to these limitations, it is not presently possible to reliably predict certain outcomes based on X-ray imaging. It is also not presently possible to obtain necessary measurements in an autonomous and/or consistent fashion that ensures reliability and reproducibility of such measurements.

CT involves using controlled amounts of X-ray radiation to obtain 3D image data of patient anatomy. Existing CT systems can include a rotating gantry that has an X-ray tube mounted on one side and an arc-shaped detector mounted on an opposite side. An X-ray beam can be emitted in a fan shape as the rotating frame spins the X-ray tube and detector around a patient. Each time the X-ray tube and detector make a 360° rotation and the X-ray passes through the patient's body, an image of a thin section of the patient anatomy can be acquired. During each rotation, the detector can record about 1,000 images or profiles of the expanded X-ray beam. Each profile can then be reconstructed by a dedicated computer into a 3D image of the section that was scanned. Accordingly, CT systems use a collection of multiple 2D CT scans or X-rays to construct a 3D image of the patient anatomy. The speed of gantry rotation, along with slice thickness, contributes to the accuracy and/or usefulness of the final image. Commonly used intraoperative CT imaging systems have a variety of settings that allow for control of the radiation dose. In certain scenarios, high dose settings may be chosen to ensure adequate visualization of the anatomical structures. The downside is increased radiation exposure to the patient. The effective doses from diagnostic CT procedures are typically estimated to be in the range of 1 to 10 millisieverts (mSv). Such high doses can lead to increased risk of cancer and other health conditions. Low dose settings are therefore selected for CT scans whenever possible to minimize radiation exposure and associated risk of cancer development. Low dose settings, however, may have an impact on the quality of the image data available for the surgeon.

MRI imaging systems operate by forming a strong magnetic field around an area to be imaged. In most medical applications, protons (e.g., hydrogen atoms) in tissues containing water molecules produce a signal that is processed to form an image of the body. First, energy from an oscillating magnetic field is temporarily applied to the patient at an appropriate resonance frequency. The excited hydrogen atoms emit a radio frequency (RF) signal, which is measured by a RF system. The RF signal may be made to encode position information by varying the main magnetic field using gradient coils. As these coils are rapidly switched on and off, they product the characteristic repetitive noise of an MRI scan. Contrast between different tissues can be determined by the rate at which excited atoms return to their equilibrium state. In some instances, exogenous contrast agents may be given intravenously, orally, or intra-articularly, to further facilitate differentiation between different tissues. The major components of an MRI imaging system are the main magnet that polarizes tissue, the shim coils for correcting inhomogeneities in the main magnetic field, the gradient system for localizing the magnetic resonance (MR) signal, and the RF system that excites the tissue and detects the resulting signal. With MRI imaging, different magnetic field strengths can be used. The most common strengths are 0.3 T, 1.5 T and 3 T. The higher the strength, the higher the image quality. For example, a 0.3 T magnetic field strength will result in lower quality imaging then a 1.5 T magnetic field strength.

Currently, there is also no autonomous way of objectively analyzing MRI images, with analysis of such images being reliant on physician training and experience. Moreover, due to technical limitations, diagnostic MRI protocols provide a limited number of slices of a target region, which leaves a physician to piece together anatomical information from available axial, sagittal, and/or coronal scans of the patient anatomy. Existing systems also lack a reliable way to easily and autonomously compare a patient's MRI images against a larger database of MRI images. Such comparison can allow a physician to obtain additional information about the severity of a patient's condition. Existing systems also lack the ability to autonomously compare a patient's MRI images at a present time against past images of that patient. In addition, it is not currently possible to screen a patient's MRI images for spinal cord compression, fracture, tumor, infection, among other conditions. Such limitations make it difficult if not impossible to make treatment recommendations based on patient MRI images that would result in a high degree of confidence in treatment outcome.

With low quality images and lack of reliable and/or reproducible image analysis, existing systems pose a diagnostic challenge for physicians. Such limitations can make it difficult to adequately identify key landmarks and conduct measurements, which may in turn lead to decreased accuracy and efficacy of treatment. In image-guided surgical applications, the limitations of existing image analysis tools can result in complications with surgical planning, including difficulty with navigating tools and implants to necessary sites. For these reasons, it can be desirable to have systems for delivering high quality images and for consistently and accurately assessing image data.

SUMMARY

Systems, devices, and methods described herein generally relate to segmentation of patient anatomy. In some embodiments, a method can include receiving a three-dimensional (3D) scan volume including a set of images of a 3D region of patient anatomy, the 3D region of patient anatomy including a set of anatomical structures: generating a set of two-dimensional (2D) radiographs using the 3D scan volume, each 2D radiograph from the set of 2D radiographs including 3D image data extracted from the 3D scan volume; and training a segmentation model to segment 2D radiographs using the set of 2D radiographs to identify one or more anatomical parts of interest.

In some embodiments, a method can include receiving a three-dimensional (3D) scan volume including a set of Magnetic Resonance Images (MRI) images of a 3D region of patient anatomy, the 3D region of patient anatomy including a set of anatomical structures, the MRI images including images in a first anatomical plane and images in a second anatomical plane different from the first plane: processing the set of MRI images using a segmentation model in which the segmentation model receives the set of MRI images as inputs and processes the images in the first and second anatomical planes: generating a segmentation output in response to processing the set of MRI images using the segmentation model; and identifying one or more anatomical parts of interest in the 3D scan volume based on the segmentation output.

In some embodiments, a method can include receiving a three-dimensional (3D) scan volume including a set of two-dimensional (2D) images of a 3D region of patient anatomy. The 3D region of patient anatomy can include a set of anatomical structures. The method can also include processing the set of 2D images using a segmentation model in which the segmentation model receives the set of 2D images as inputs, generating a segmentation output in response to processing the set of 2D images using the segmentation model, and identifying one or more intervertebral discs in the 3D scan volume based on the segmentation output.

In some embodiments, an apparatus can comprise a memory and a processor operatively coupled to the memory. The processor can be configured to receive a three-dimensional (3D) scan volume including a set of Magnetic Resonance Imaging (MRI) images of a 3D region of a patient anatomy. The 3D region of patient anatomy can include a set of anatomical structures. The MRI images can include images in a first anatomical plane and images in a second anatomical plane different from the first anatomical plane. The processor can also be configured to process the set of MRI images using a segmentation model in which the segmentation model receives the set of MRI images as inputs and processes the images in the first and second anatomical planes, generate a segmentation output in response to processing the set of MRI images using the segmentation model, and identify one or more anatomical parts of interest in the 3D scan volume based on the segmentation output.

In some embodiments, an apparatus can include a memory and a processor operatively coupled to the memory. The processor can be configured to receive a three-dimensional (3D) scan volume including a set of two-dimensional (2D) images of a 3D region of patient anatomy. The 3D region of patient anatomy can include a set of anatomical structures. The processor can also be configured to process the set of 2D images using a segmentation model in which the segmentation model receives the set of 2D images are inputs, generate a segmentation output in response to processing the set of 2D images using the segmentation model, and identify one or more intervertebral discs in the 3D scan volume based on the segmentation model.

BRIEF DESCRIPTION OF THE DRAWINGS

FIG. 5 is a flow chart illustrating a process of segmenting patient anatomy, according to some embodiments.

FIG. 7 is a flow chart illustrating a process of segmenting patient anatomy, according to some embodiments.

FIG. 15A is a digitally reconstructed 2D radiograph that is generated based on 3D image data, according to some embodiments. FIG. 15B is an image of a digitally reconstructed 2D radiograph that is generated based on transformed 3D image data, according to some embodiments.

FIG. 16A is an image of an X-ray, according to some embodiments. FIG. 16B depicts a segmentation output of the X-ray of FIG. 16A, according to some embodiments.

FIGS. 18A, 18C, and 18E are images of patient anatomy produced using MRI, according to some embodiments. FIGS. 18B, 18D, and 18F are images of labeled anatomical parts corresponding to the MRI images of FIGS. 18A, 18C, and 18E, respectively, according to some embodiments.

DETAILED DESCRIPTION

1. Overview of System

Systems, devices, and methods described herein relate to processing of patient anatomical structures, including a spine. While certain examples presented herein may generally relate to processing of image data of a spine, it can be appreciated by one of ordinary skill in the art that such systems, devices, and methods can be used to process image data of other portions of patient anatomy, including, for example, vessels, nerves, bone, and other soft and hard tissues near the brain, heart, or other regions of a patient's anatomy.

Systems, devices, and methods described herein can be suited for processing several different types of image data, including X-ray, CT, MRI, fluoroscopic, ultrasound, etc. In some embodiments, such systems, devices, and methods can process a single image type, while in other embodiments, such systems, devices, and methods can process multiple image types. In some embodiments, multiple image types can be combined to provide richer data regarding a patient's anatomy.

Systems, devices, and methods described herein can implement machine learning models to process and/or analyze image data regarding a patient's anatomy. Such machine learning models can be configured to identify and differentiate between different anatomical parts within anatomical structures. In some embodiment, machine learning models described herein can include neural networks, including deep neural networks with multiple layers between input and output layers. For example, one or more convolutional neural networks (CNNs) can be used to process patient image data and produce outputs classifying different objects within the image data. While certain examples described herein employ CNNs, it can be appreciated that other types of machine learning algorithms can be used to process patient image data, including, for example, support vector machines (SVMs), decision trees, k-nearest neighbor, and artificial neural networks (ANNs).

Figure 1:
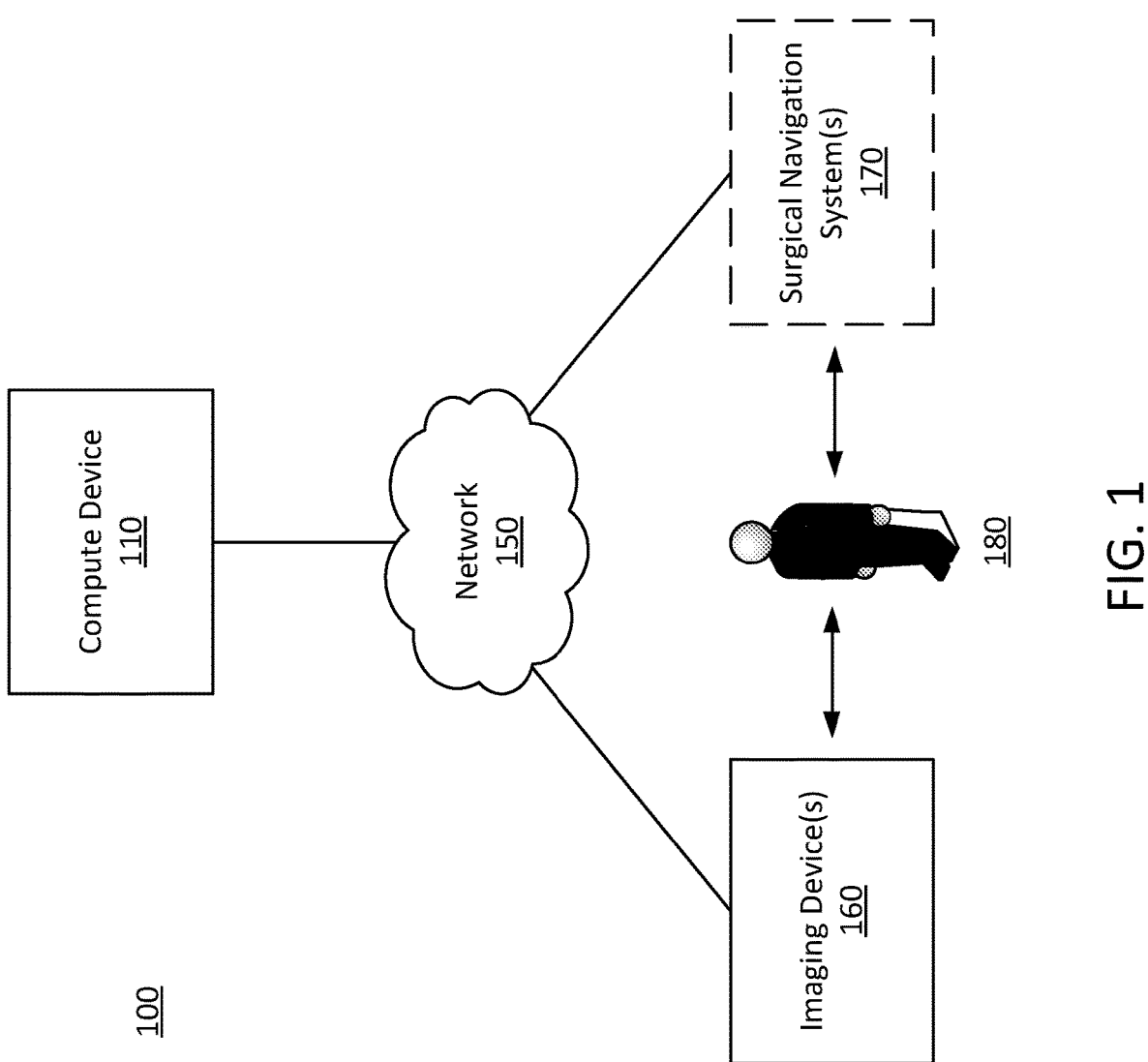
FIG. 1 is a block diagram illustrating a configuration of a system for segmenting an image, according to some embodiments.

FIG. 1 is a high-level block diagram that illustrates a system 100 for processing image data of patient anatomy and providing image guidance to physicians during a surgical procedure, according to some embodiments. The system 100 can include a compute device 110, an imaging device(s) 160, and, optionally, a surgical navigation system(s) 170. In some embodiments, the compute device 110 can communicate with one or more imaging device(s) 160 and surgical navigation systems 170 to perform segmentation of patient anatomical structures and to provide digital guidance to surgeons during surgical procedures.

The compute device 110 may be configured to perform segmentation of anatomical image data to identify anatomical parts of interest. The compute device 110 can be configured to generate segmentation outputs that identify different anatomical parts of interest. Additionally, the compute device 110 can be configured to label different anatomical parts and/or to generate virtual representations of patient anatomy and/or surgical instruments to provide image guides to surgeons during surgical procedures. The compute device 110 may be implemented as a single compute device, or be implemented across multiple compute devices that are connected to each other and/or the network 150. For example, the compute device 110 may include one or more compute devices such as servers, desktop computers, laptop computers, portable devices, databases, etc. Different compute device may include component(s) that are remotely situated from other compute devices, located on premises near other compute devices, and/or integrated together with other compute devices.

In some embodiments, the compute device 110 can be located on a server that is remotely situated from one or more imaging device(s) 160 and/or surgical navigation system(s) 170. For example, an imaging device 160 and a surgical navigation system 170 can be located in a surgical operating room with a patient 180, while the compute device 110 can be located at a remote location but be operatively coupled (e.g., via network 150) to the imaging device 160 and the surgical navigation system 170. In some embodiments, the compute device 110 can be integrated into one or both of the imaging device 160 and the surgical navigation system 170. In some embodiments, system 100 includes a single device that includes the functionality of the compute device 110, one or more imaging device(s) 160, and one or more surgical navigation system(s) 170, as further described herein.

In some embodiments, the compute device 110 can be located within a hospital or medical facility. The compute device 110 can be operatively coupled to one or more databases associated with the hospital, e.g., a hospital database for storing patient information, etc. In some embodiments, the compute device 110 can be available to physicians (e.g. surgeons) for performing evaluation of patient anatomical data (including, for example, segmentation data as described herein), visualization of patient anatomical data, diagnoses, and/or planning of surgical procedures. In some embodiments, the compute device 110 can be operatively coupled to one or more other compute devices within a hospital (e.g., a physician workstation), and can send segmentation outputs and/or other image processing outputs to such compute devices (e.g., via network 150) for performing evaluation of patient anatomical data, visualization of patient anatomical data, diagnoses, and/or planning of surgical procedures.

Network 150 may be any type of network (e.g., a local area network (LAN), a wide area network (WAN), a virtual network, a telecommunications network) implemented as a wired network and/or wireless network and used to operatively couple compute devices, including system 100. As shown in FIG. 1, a connection may be defined between compute device 110 and any one of imaging device(s) 160, surgical navigation system(s) 170, and/or other compute devices (e.g., databases, servers, etc.). In some embodiments, the compute device 110 may communicate with imaging device(s) 160 and/or surgical navigation system(s) 170 (e.g., send data to and/or receive data from such devices) and with the network 150 via intermediate networks and/or alternate networks (not shown in FIG. 1). Such intermediate networks and/or alternate networks may be of a same type and/or a different type of network as network 150. Each of the compute device 110, imaging device(s) 160, and surgical navigation system(s) 170 may be any type of device configured to send data over the network 150 to send and/or receive data from one or more of the other devices.

In some embodiments, an imaging device 160 may refer to any device configured to image anatomical structures of a patient 180. In some embodiments, the imaging device 160 may include one or more sensors for measuring signals produced by various imaging technologies. The imaging device 160 can employ a non-invasive technology to image a patient's anatomy. Non-limiting examples of imaging devices include CT scanners, MRI scanners, X-ray devices, ultrasound devices, and combinations thereof, and the like. The image data generated by the imaging device 160 may be transmitted to any of the devices connected to network 150, including, for example, compute device 110. In some embodiments, the image data generated by the imaging device 160 can include a 2D image of an anatomical structure. In some embodiments, the image data generated by the imaging device 160 can include a plurality of 2D image scans that together provide image data for a 3D volume. The imaging device 160 can transmit the image data to the compute device 110 such that the compute device 110 can perform segmentation of the patient anatomy and/or label different anatomical parts of interest in the patient anatomy. Additionally, the imaging device 160 can provide the image data to a surgical navigation system 170 such that the surgical navigation system can generate one or more virtual representations of the patient anatomy, e.g., for use in image-guided surgery.

The surgical navigation system 170 can be configured to provide image-guided surgery, e.g., during a surgical operation. For example, the surgical navigation system 170 may facilitate one or more of planning, visualization, and guidance during a surgical procedure. In some embodiments, the surgical navigation system 170 can include a tracking system for tracking patient anatomy, surgical tool(s), implant(s), or other objects within a surgical field. In some embodiments, the surgical navigation system 170 can include an image generator for generating one or more virtual representations of patient anatomy and/or surgical tool(s), implant(s), or other objects within a surgical field and to display these to a physician or other healthcare provider (e.g., a surgeon). In some embodiments, the surgical navigation system 170 can be configured to present a 3D display, e.g., via a 3D wearable device and/or a 3D projector or screen. In some embodiments, the surgical navigation system 170 can be configured to display a position and/or orientation of one or more surgical instrument(s) and implant(s) with respect to presurgical or intraoperative medical image data of the patient anatomy. The image data can be provided, for example, by an imaging device 160, and the surgical navigation system 170 can use the image data to generate a virtual representation of one or more anatomical parts of interest along with position and/or orientation data associated with a surgical device. Suitable examples of surgical navigation systems are described in U.S. Patent Application Publication No. 2019/0053851, published Feb. 21, 2019, and incorporated herein by reference.

Figure 2:
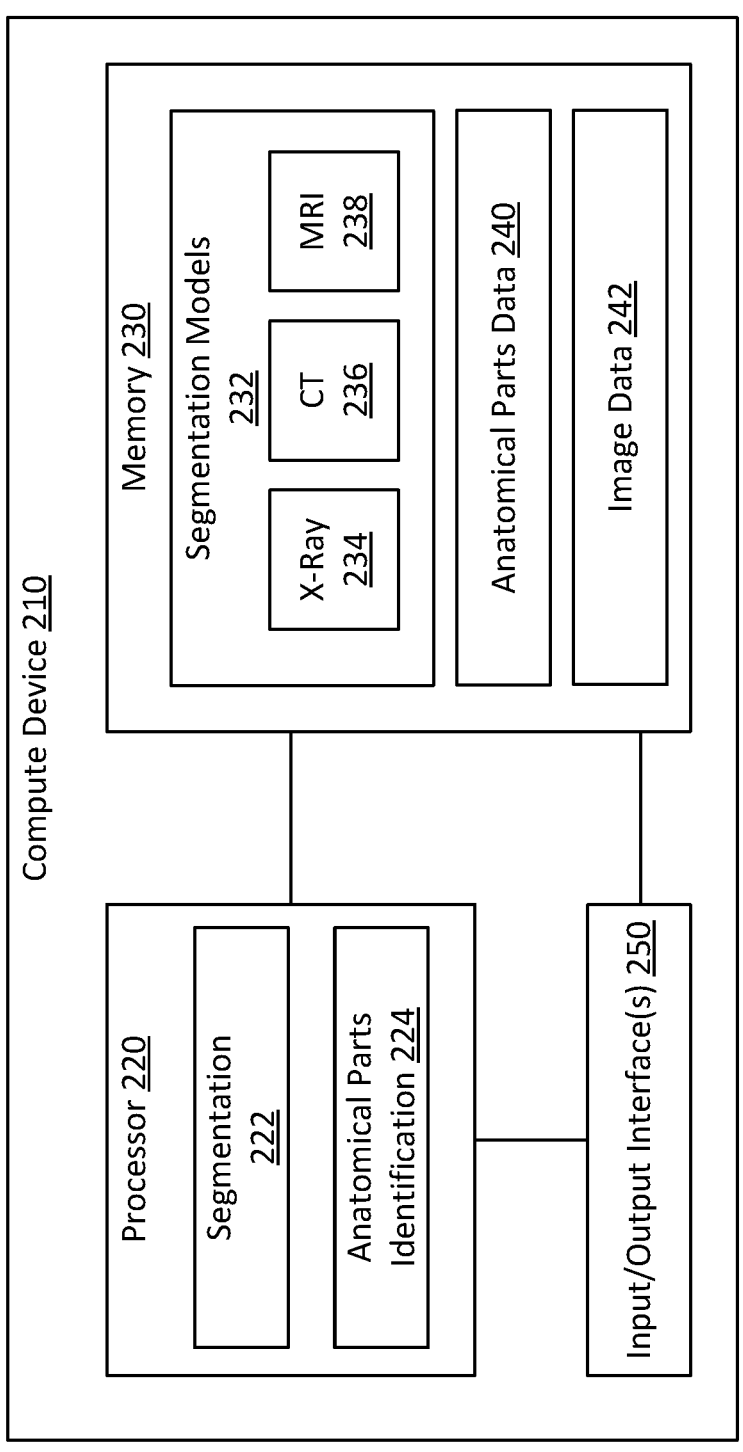
FIG. 2 is a block diagram illustrating a configuration of a device for segmenting an image, according to some embodiments.

FIG. 2 schematically illustrates an example compute device 210 for performing segmentation, according to some embodiments. Compute device 210 can be structurally and/or functionally similar to compute device 110. While a single compute device 210 is schematically depicted, it can be appreciated that the compute device 210 can be implemented as one or more compute devices. In some embodiments, compute device 210 may be configured to segment anatomical image data of a patient (e.g., patient 180). Compute device 210 includes a processor 220, a memory 230, and one or more input/output interface(s) 250.

Memory 230 may be, for example, a random access memory (RAM), a memory buffer, a hard drive, a database, an erasable programmable read-only memory (EPROM), an electrically erasable read-only memory (EEPROM), a read-only memory (ROM), and/or so forth. In some embodiments, memory 230 stores instructions that cause processor 220 to execute modules, processes, and/or functions associated with segmentation 222 and anatomical parts identification 224. Memory 230 can store one or more segmentation models 232, anatomical parts data 240, and/or image data 242.

The segmentation models 232 can be machine learning models, such as, for example, a CNN model, a SVM model, etc. The segmentation models 232 can be implemented by the processor 220 to perform segmentation 222. In some embodiments, the segmentation models 232 can be unique to particular anatomical regions, e.g., spinal anatomy, cardiac anatomy, etc. In some embodiments, the segmentation models 232 can be unique to particular image types. For example, the segmentation models 232 can include an X-ray model 234 for segmenting X-ray image data, a CT model 236 for segmenting CT image data, and/or an MRI model 238 for segmenting MRI image data. The anatomical parts data 240) can include information relating to anatomical parts of a patient. For example, the anatomical parts data 240 can include information identifying, characterizing, and/or quantifying different features of one or more anatomical part(s), such as, for example, a location, color, shape, geometry, or other aspect of an anatomical part. The anatomical parts data 240 can enable processor 220 to perform anatomical parts identification 224 based on patient image data. The image data 242 can include image data associated with one or more patient(s) and/or information about different image devices, e.g., different settings of different image devices (e.g., image device(s) 160) and how those settings may impact images captured using those devices.

The processor 220 may be any suitable processing device configured to run and/or execute any of the functions described herein. In some embodiments, processor 220 may be a general purpose processor, a Field Programmable Gate Array (FPGA), an Application Specific Integrated Circuit (ASIC), a Digital Signal Processor (DSP), a Dedicated Graphics Processing Unit (GPU), and/or the like. In some embodiments, the processor 220 can be configured to perform one or more of segmentation 222 and anatomical parts identification 224. Segmentation 222 and anatomical parts identification 224 can be implemented as one or more programs and/or applications that are tied to hardware components (e.g., processor 220, memory 230, input/output interface(s) 250). In some embodiments, a system bus (not shown) may be configured to enable processor 220, memory 230, input/output interface(s) 250, and/or other components of the compute device 210 to communicate with each other.

The input/output interface(s) 250 may include one or more components that are configured to receive inputs and send outputs to other devices (e.g., imaging device(s) 160, surgical navigation system(s) 170, etc.). In some embodiments, the input/output interface(s) 250 can include a user interface, which can include one or more components that are configured to receive input and/or present output to a user. For example, input/output interface 250 may include a display device (e.g., a display, a touch screen, etc.), an audio device (e.g., a microphone, a speaker), a keypad, and/or other interfaces for receiving information from and/or presenting information to users. In some embodiments, the input/output interface 250 can include a communications interface for communicating with other devices, and can include conventional electronics for data communication using a standard communication protocol, e.g., Wi-Fi, Bluetooth®, etc.

2. Overview of Segmentation Models

Systems, devices, and methods described herein can use a neural network and deep learning based approach to segment patient anatomy and/or identify anatomical parts of interest. As described above, a compute device (e.g., compute devices 110, 210) for performing segmentation and anatomical part identification can implement one or more machine learning models. The machine learning models can be trained using training datasets including input image data and labels representing desired outputs. The machine learning models can use the training datasets to learn relationships between different features in the image data and the output labels.

In some embodiments, systems, devices, and methods described herein can perform pre-processing of image data prior to performing segmentation and/or anatomical part identification. In many instances, image data collected using conventional imaging techniques can have low quality. For example, to avoid the risks of exposing patients to high levels of radiation, a CT imaging device may be used on a lower dose setting to capture images of patient anatomy. Similarly, MRI imaging devices using lower power may be used to capture images of patient anatomy. Such low dose or low power images can have images that have a higher amount of noise. A compute device (e.g., compute devices 110, 210) as described herein can optionally pre-process the image to remove such noise prior to performing segmentation and/or anatomical part identification.

Figure 3A:
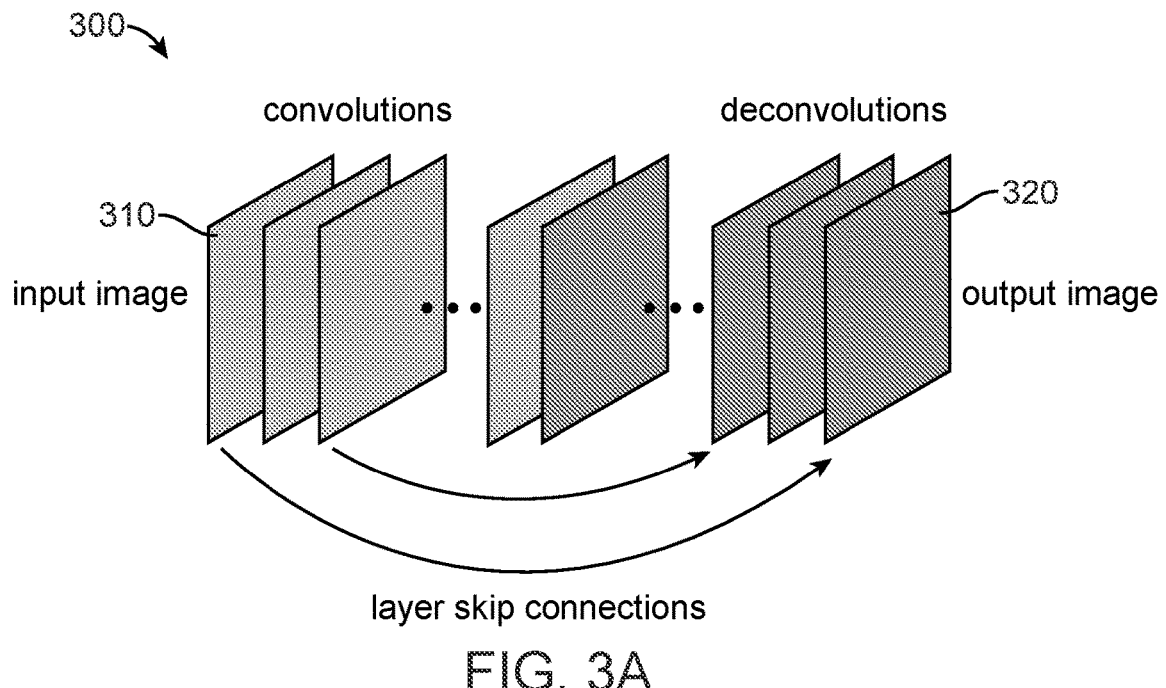
FIG. 3A is a schematic illustrating a denoising convolutional neural network, according to some embodiments.

FIG. 3A schematically depicts an architecture for a CNN model 300, which is utilized for denoising image data. In some embodiments, systems, devices, and methods described herein can optionally perform de-nosing, while in other embodiments, such de-noising may not be necessary before performing segmentation, as described below. The CNN 300 includes convolution layers 310 (with rectified linear activation function (ReLU) activation) and deconvolution layers 320 (with ReLU activation). The CNN 300 can be fully convolutional and have layer skip connections. The number of layers and the number of filters within layers can be subject to change, depending on requirements of an application. Deeper networks with more filters can give results of better quality, but increasing the number of layers/filters can significantly increases the computation time and therefore be impractical for certain applications. The use of the CNN 300 for denoising image data can provide improvements over standard de-noising techniques, such as, for example, filtering, smoothing, etc. The CNN 300, for example, can be calibrated to remove specific noise associated with a type of imaging device (e.g., CT, MRI, X-ray), a specific imaging device, and/or different settings of different imaging devices. The CNN 300 can be trained using a training dataset that includes low quality images and corresponding high quality images. The CNN 300 can be trained using the training dataset to identify noise components added to the low quality images as compared to the high quality images.

Figure 3B:
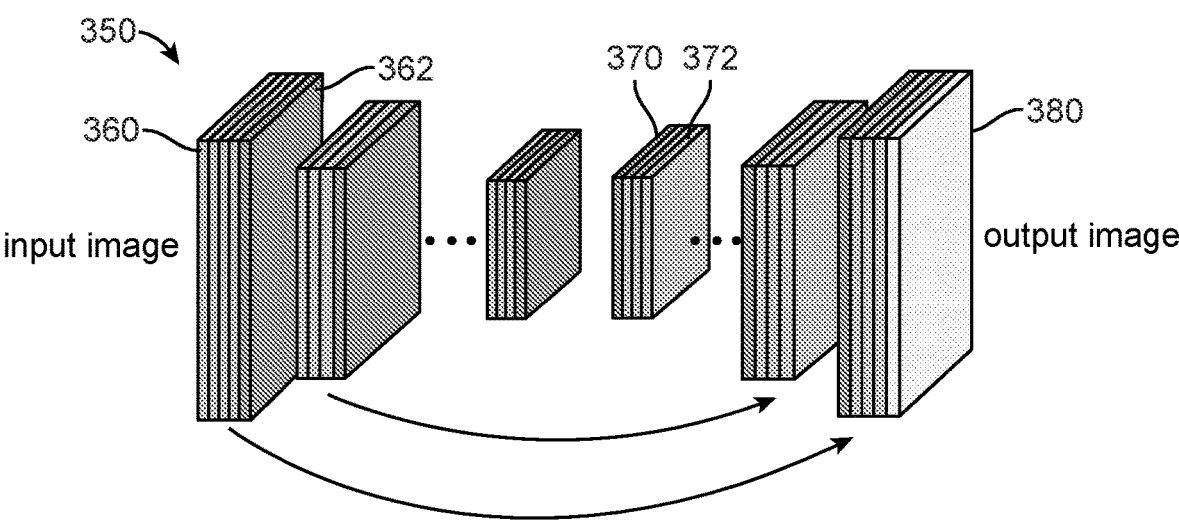
FIG. 3B is a schematic illustrating a segmentation convolutional neural network, according to some embodiments.

FIG. 3B schematically depicts an architecture for a CNN model 350, which can be utilized for performing segmentation (e.g., both semantic and binary). The architecture of the CNN model 350 can be fully convolutional and have layer skip connections. The CNN model 350 can perform pixel-wise class assignment using an encoder-decoder architecture. The CNN model 350 can take as the input the raw images generated by an imaging device (e.g., imaging device 160) and/or the images generated by the imaging device after denoising, e.g., with a CNN model for denoising (e.g., CNN model 300).

The left side of the CNN model 350 is a contracting path (encoder), which includes one or more convolution layers 360 and/or pooling layers 362. One or more images (e.g., raw images or denoised images) can be presented to the input layer of the CNN model 350, and the CNN model 350 via the series of convolution layers 360 and/or pooling layers 362 can extract features from the image data. The image data can include a single image (e.g., an X-ray image or a single image scan) or a set of images of 2D scans that together form a local volume representation. The convolution layers 360 can be of a standard kind, the dilated kind, or a combination thereof, with ReLU or leaky ReLU activation attached.

The right side of the CNN model 350 is an expanding path (decoder), which includes upsampling or transpose convolution layers 370 and convolution layers 372, which results in an output layer 380. The upsampling or deconvolution layers 370 can be of a standard kind, the dilated kind, or a combination thereof, with ReLU or leaky ReLU activation attached. The output layer 380 can represent a convolutional layer with Softmax or Sigmoid activation for converting output scores into a normalized probability distribution.

The encoding-decoding architecture of the CNN model 350 can be supplemented with additional skipping connections of layers with corresponding sizes (e.g., resolutions), which can improve performance through information merging.

The CNN model 350 can be configured to process images of different sizes by adjusting the size (e.g., resolution) of the layers. Depending on requirements of particular applications, the number of layers and/or number of filters within a layer can also be adjusted. For example, deeper networks with a greater number of layers and/or filters can give results with better quality, but increasing the number of layers and/or filters can significantly increase the computation time and decrease the capability of the CNN model 350 to generalize. Therefore, a greater number of layers and/or filters can be impractical for certain applications.

In some embodiments, the CNN model 350 can be used to perform segmentation of patient anatomy. For example, the CNN model 350 can be configured to classify portions of images (e.g., each pixel or groupings of pixels) into two different classes, e.g., bone and not bone. In some embodiments, the CNN model 350 can be configured to classify portions of images into multiple classes, e.g., bone, nerve, vertebral body, pedicles, processes, etc. In some embodiments, a first CNN model can be configured to perform a first classification (e.g., bone and not bone), and the output of that first CNN model 350 can be combined and inputted into one or more additional CNN models 350 that are configured to perform one or more additional classifications (e.g., nerve or not nerve, intervertebral disc or not intervertebral disc, etc.). In some embodiments, the CNN model 350 can be trained to segment patient anatomy using a training dataset including images with labeled anatomical parts.

Suitable examples of CNN models 350 configured for performing segmentation are described in U.S. Patent Publication No. 2019/0105009, published Nov. 11, 2019: U.S. Patent Publication No. 2020/0151507, published May 14, 2020; and U.S. Patent Publication No. 2020/0410687, published Dec. 31, 2020, the contents of each of which are incorporated herein by reference.

Further details of the training and use of CNN models are discussed with reference to the flow diagrams depicted in FIGS. 4A-7. The methods depicted in FIGS. 4A-7 can be implemented by one or more devices as described with reference to FIGS. 1 and 2, including, for example, compute device 110, 210.

Figure 4A:
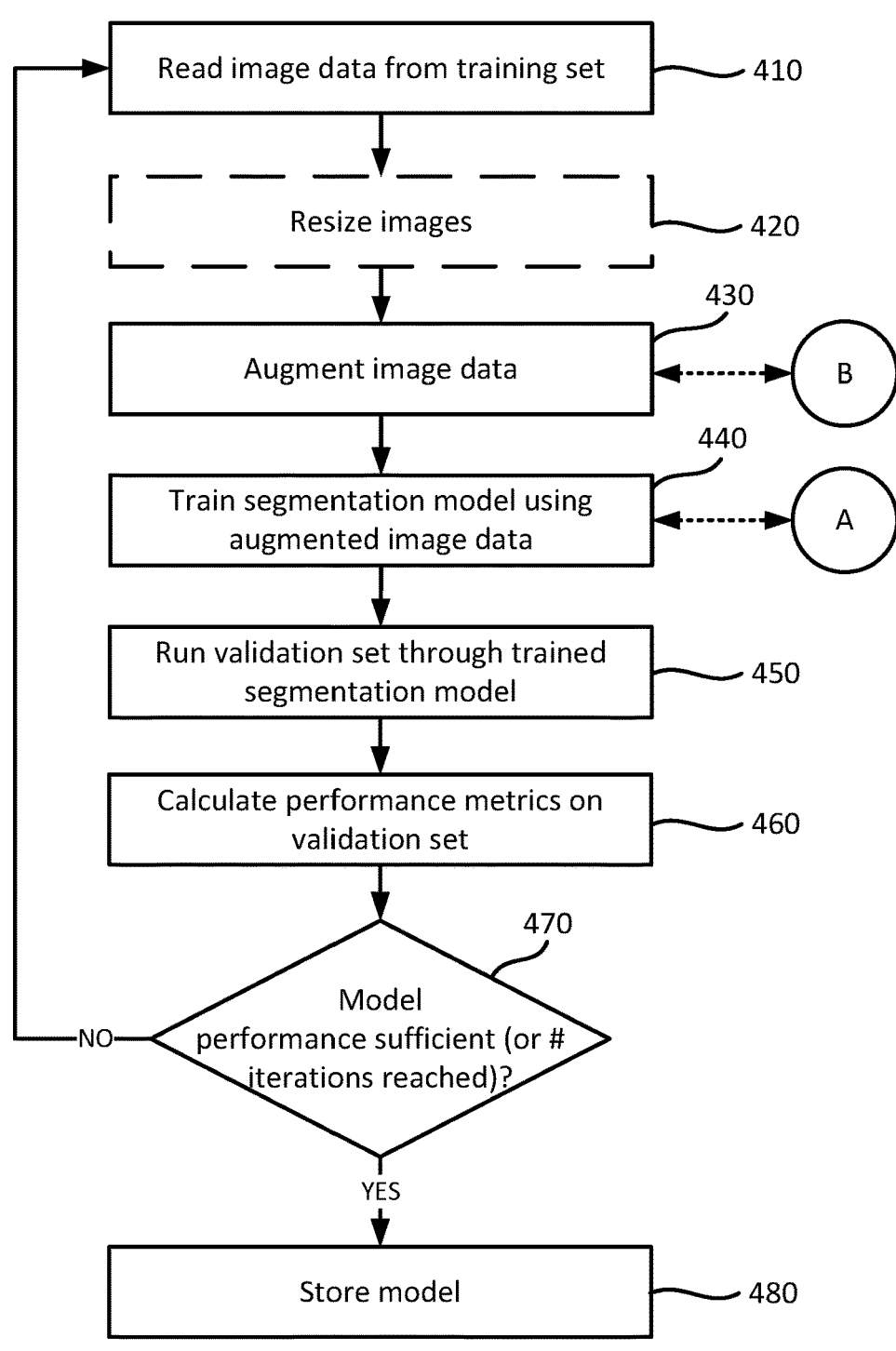
FIG. 4A is a flow chart illustrating a process for training a segmentation model, according to some embodiments.

FIG. 4A is a flow chart of a method 400 of training a segmentation model (e.g., CNN model 350). The method 400 may include reading image data from a training dataset, at 410. The training dataset can include input images of anatomical structures and corresponding output images of anatomical structures with labelling applied to different parts of the anatomical structures. The images can be grouped into multiple batches for training the segmentation model. Each image within a batch can include images representative of a series of slices of a 3D volume of an anatomical structure. Each output image can include at least one label which identifies a portion of that image as corresponding to a specific anatomical part. In some embodiments, each output image can include a plurality of labels, with the plurality of labels indicating different parts of the patient anatomy. A compute device (e.g., compute device 110, 210) can read the image data by loading one or more batches of images into arrays for further processing.

Optionally, the images read from the training dataset can be resized, at 420. For example, the images captured by different imaging devices can vary in size, and therefore a base size can be established for inputting into the segmentation model. Images that do not conform to the base size can be resized, e.g., using a resizing function.

At 430, the image data may be augmented. Data augmentation can be performed on the image data to create a more diverse set of images. Each input image and its corresponding output image can be subjected to the same data augmentation, and the resulting input and output images can be stored as new images within the training dataset. The data augmentation can include applying one or more transformations or other data processing techniques to the images. These transformations or processing techniques can include: rotation, scaling, movement, horizontal flip, additive noise of Gaussian and/or Poisson distribution and Gaussian blur, etc. Data augmentation can be performed on any image type, including, for example, X-ray, CT scans, and/or MRI scans. In some embodiments, data augmentation can be performed on 3D image data (e.g., 3D CT image data including 2D scans of a 3D volume), and the augmented 3D image data can be used to construct 2D images. For example, as further described with reference to FIG. 12, 3D image data can be subjected to one or more augmentation transformations, and the resulting 3D image data can be used to construct 2D radiographs for use in training a CNN model for segmenting X-ray images.

At 440, a segmentation model may be trained using the training dataset, including the original image data and/or the augmented image data. In some embodiments, the training can be supervised. The training can include inputting the input images into the segmentation model, and minimizing differences between an output of the segmentation model and the output images (including labeling) corresponding to the input images. In some embodiments, the segmentation model can be a CNN model, whereby one or more weights of a function can be adjusted to better approximate a relationship between the input images and the output images. Further details of training a CNN model are described with reference to FIG. 4B. In some embodiments, the training can be unsupervised, e.g., where the segmentation model relies on a distance between feature vectors to classify unknown data points.

A validation dataset may be used to assess one or more performance metrics of the trained segmentation model. Similar to the training dataset, the validation dataset can include input images of anatomical structures and output images including labelled anatomical parts within the anatomical structures. The validation dataset can be used to check whether the trained segmentation model has met certain performance metrics or whether further training of the segmentation model may be necessary. At 450, input images of a validation dataset can run through the trained segmentation model to obtain outputs. At 460, one or more performance metrics can be calculated based on the outputs of the validation dataset. For example, the outputs of the validation dataset can be compared to the output images that correspond to the input images, and differences between the outputs of the model and the output images can be evaluated on a qualitative and/or quantitative scale. Different performance metrics can be calculated based on the differences between the outputs of the model and the output images corresponding to the input images. For example, a number or percentage of pixels (or groupings of pixels) that are classified correctly or incorrectly can be determined.

At 470, the compute device can determine whether training is completed (e.g., performance of the trained segmentation model is sufficient and/or a certain number of training iterations has been met) or whether further training is necessary. In some embodiments, the compute device can continue to cycle through training iterations (i.e., proceed back to 410-460) until the performance of the trained model no longer improves by a predetermined amount (i.e., the performance metrics of a later training iteration 410-460 do not differ from the performance metrics of an earlier training iteration 410-460 by a predefined threshold value or percentage). If the model is not improving, the segmentation model may be overfitting the training data. In some embodiments, the compute device can continue to cycle through training iterations (i.e., proceed back to 410-460) until the performance metrics of a training iteration 410-460 reaches a certain predefined threshold indicative of sufficient performance. In some embodiments, the compute device can continue to cycle through training iterations (i.e., proceed back to 410-460) until a predefined number of iterations has been met (i.e., the segmentation model has been trained a predefined number of times).

Once the segmentation model has been sufficiently trained (470: YES), the segmentation model can be stored, e.g., in a memory (e.g., memory 230), at 480. The stored segmentation model can be used by the compute device in an inference process, e.g., to perform segmentation on new image data of a patient.

Figure 4B:
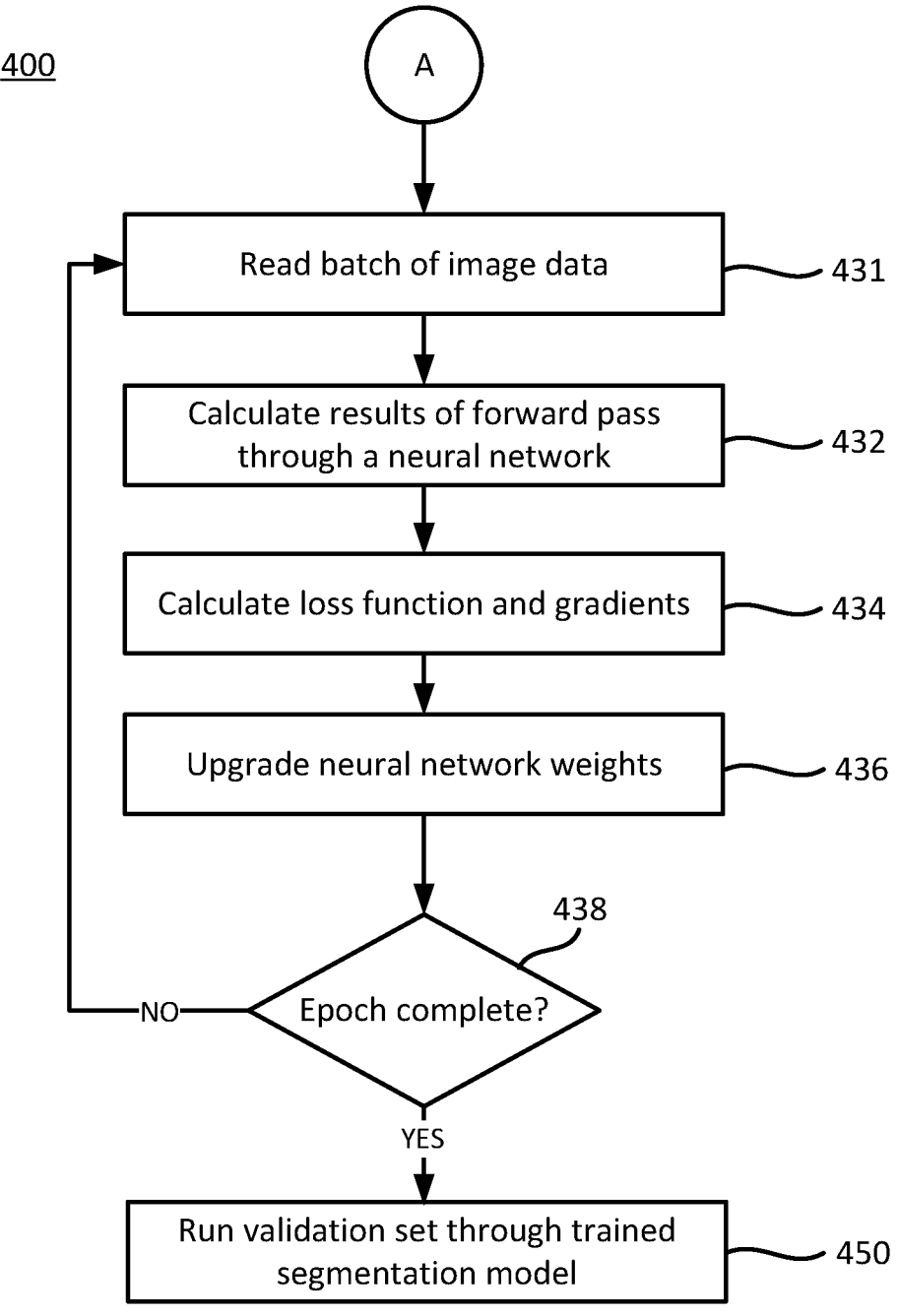
FIG. 4B is a flow chart illustrating training of a neural network, according to some embodiments.

FIG. 4B is a flow chart of a method 400 of training of a segmentation model implemented as a neural network such as, for example, a CNN. The neural network model can be trained to tune the parameters of the neural network model to be able to classify different portions of the image data based on features extracted from those portions. The neural network after being trained can be used to segment a plurality of images, e.g., 2D scans of patient anatomy, and to combine these images to form a 3D model of an anatomical structure.

The method 400 can include reading a batch of image data from a training dataset, at 431. As described above, the training dataset can include input images of patient anatomy and corresponding output images of labeled (e.g., presegmented) patient anatomy. Batches of images can be read from the training dataset one at a time, and processed using the neural network. In some embodiments, the batches of images can include augmented images, as described above. For example, certain input and output images can be subjected to one or more transformations or other augmentation techniques, and the transformed or augmented images can be included in a training dataset for training the neural network.

The batch of images can be passed through the layers of the neural network in a standard forward pass, at 432. The forward pass can return outputs or results, which can be used to calculate a value of a loss function, at 434. The loss function or objective function represents the function that is used to evaluate a difference between the desired output (as reflected in the output images that correspond to the input images) and the output of the neural network. The value of the loss function can indicate a measure of that difference between the desired output and the output of the neural network. In some embodiments, the difference can be expressed using a similarity metric, including, for example, a mean squared error, mean average error, or categorical cross-entropy. The value of the loss function can be used to calculate the error gradients, which in turn can be used to update one or more weights of the neural network, at 436. The weights can be updated to reduce the value of the loss function in a subsequent pass through the neural network.

At 438, the compute device can determine whether the training has cycled through the full training dataset, i.e., whether the epoch is complete. If the epoch has been completed, then the process can continue to 450, where a validation dataset is used to evaluate the performance metrics of the trained segmentation model. Otherwise, the process may return to 431, where a next batch of images is read.

FIG. 5 is a flow chart of a method 500 of an inference process using a trained segmentation model, according to some embodiments. The method 500 may include reading a batch of images from patient image data, at 510. The images can be new images that are acquired of a patient's anatomical structure. The images can be, for example, 2D scans of a 3D volume of the anatomical structure. In some embodiments, the images can include CT images, MRI images, and/or X-ray images.

Optionally, at 520, one or more images may be preprocessed. For example, the one or more images can be denoised using a model for denoising image data, as described above with reference to FIG. 3A. Alternatively or additionally, the one or more images can be processed using other techniques, such as, for example, filtering, smoothing, cropping, normalizing, resizing, etc. The one or more images can be preprocessed using the same parameters that were utilized to process the images during the training process, as described above with reference to FIGS. 4A and 4B. In some embodiments, inference-time distortions can be applied to one or more images, with a predefined number of distorted images being created for each input image. These distorted images can create inference results that are robust as to small variations in brightness, contrast, orientation, etc.

At 530, the image data (e.g., processed and/or distorted images) may be inputting into a segmentation model. In instances where the segmentation model is implemented as a CNN, the input images can be passed through the layers of the CNN. The segmentation model can return outputs on the image data. Optionally, at 540, the output of the segmentation model may be postprocessed, e.g., using linear filtering (e.g., Gaussian filtering), non-linear filtering, median filtering, or morphological opening or closing.

In some embodiments, the output of the segmentation model can include the per-class probabilities for each pixel (or group of pixels) of each image of the image data. For example, the segmentation model can be configured to classify the image data into one of a plurality of classes. Accordingly, the segmentation model can be configured to generate, for each pixel or group of pixels in the images, the probability that that pixel or group of pixels belongs to any one of the classes from the plurality of classes. The plurality of classes can correspond to a plurality of anatomical parts of the anatomical structure. Optionally, at 550, a probability map may be generated for each class from the plurality of classes based on the per-class probabilities.

At 560, if more batches of image data need to be processed, then the method 500 can return to 510 and read another batch of image data. Alternatively, if all batches have been processed (i.e., inference has been performed on all batches), then a 3D anatomical model of the patient anatomical structure can be generated, at 570, e.g., based on the outputs of the segmentation model such as, for example, the probability maps and/or per-class probabilities of the images.

At 580, the 3D anatomical model and/or the outputs of the segmentation model can be stored in memory (e.g., memory 230). In some embodiments, the 3D anatomical model can be converted or used to generate a virtual representation of the patient's anatomical structure, such as, for example, a polygonal mesh representation. The parameters of the virtual representation (e.g., volume and/or mesh representation) can be adjusted in terms of color, opacity, mesh decimation, etc. to provide different views of the patient anatomical structure to a user (e.g., a surgeon). At 590, 2D or 3D images of the 3D anatomical model may be visualized, e.g., on a display system of a surgical navigation system (e.g., surgical navigation system 170).

While not depicted in FIG. 5, segmented image data may be processed to analyze one or more characteristics of a patient's anatomical structures. For example, segmented anatomy may be analyzed to perform identification (e.g., level identification of different levels of the spine), geometric measurements and/or evaluations, and/or dimensional measurements and/or evaluations. Example of level identification of spinal anatomy are described in U.S. Patent Application Publication No. 2020/0327721, published Oct. 15, 2020, the contents of which are incorporated herein by reference.

In some embodiments, systems and devices described herein can train segmentations models using previously obtained segmentation data and/or manual segmentation data of an anatomical structure. In some embodiments, systems and devices described herein can train a first segmentation model and subsequently use the first segmentation model to generate segmentation data that can be used to train a second segmentation model. The first and second segmentation models, after being trained, can be used in inference processes to segment different parts of patient anatomy. For example, the first segmentation model can be used to segment a first type of anatomical structure (e.g., bony structure), and the second segmentation model can be used to segment a second type of anatomical structure. In some embodiments, segmentation models described herein can be trained to process multi-dimensional (e.g., 3D) anatomical data. Further details of such segmentation and inference processes are described with reference to FIGS. 6 and 7.

Figure 6:
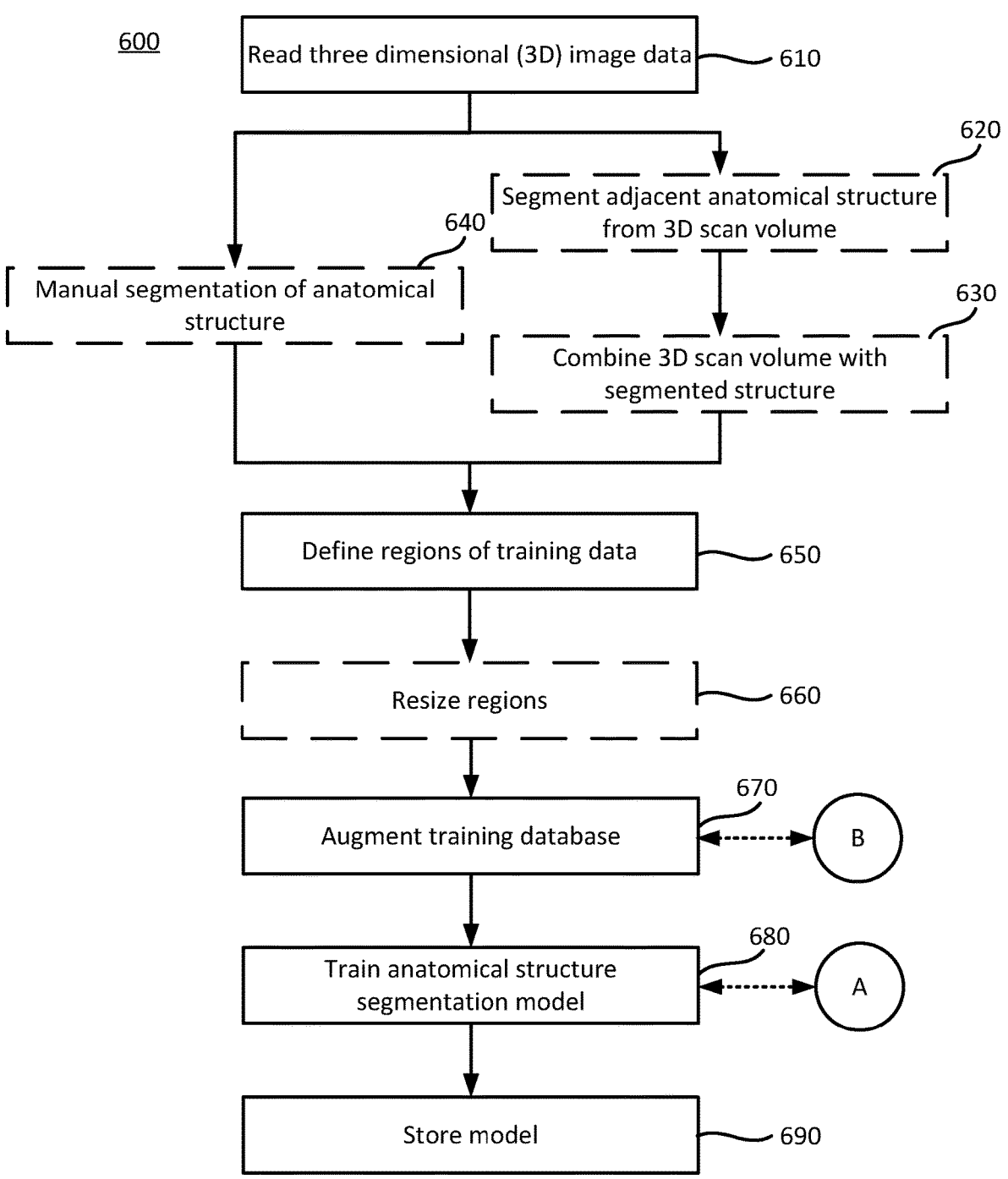
FIG. 6 is a flow chart illustrating a process for training a segmentation model, according to some embodiments.

FIG. 6 is a flow chart of a method 600 of training a segmentation model, according to some embodiments. The method 600 can be similar to the method 400 described above, but can include steps involving initial segmentation of adjacent anatomical structure and processing of multi-dimensional (e.g., 3D) regions of image data.

The method 600 can include reading, e.g., from a database or memory (e.g., memory 230), a set of images from a training dataset. The set of images can be DICOM (Digital Imaging and Communications in Medicine) images obtained from a preoperative or intraoperative imaging device, such as a CT or MRI scanner. The images can represent consecutive slices (i.e., 2D images) of 3D anatomical structure, and can be received in the form of a 3D scan volume of images. The set of images can be paired with output images including labels associated with different anatomical parts of the 3D anatomical structure. The output images can represent the desired output of a trained segmentation model.

The images can be labeled or segmented. In some embodiments, the images can optionally be segmented by a human operator, e.g., a technician, physician, radiologist, etc., at 640. For example, the human operator can manually mark in the 3D scan volume one or more anatomical parts. The human operator can use different colors or markings to indicate different anatomical parts of interest. In some embodiments, the images can optionally be processed by a trained segmentation model to perform segmentation of adjacent anatomical parts or structures, at 620. For example, the trained segmentation model can be trained to classify the image data into one or more classes representing adjacent anatomical parts or structures. The adjacent anatomical parts can be ones that neighbor (e.g., are near) the one or more anatomical parts or structures of interest. For example, the trained segmentation model can be used to identify bony structure (e.g., vertebral bodies, pedicles, transverse processes, lamina, and/or spinous processes) that is adjacent to one or more soft tissue structures of interest (e.g., nerves, intervertebral discs, etc.). At 630, the segmentation data outputted by the trained segmentation model can optionally be combined with the 3D scan volume. In some embodiments, the segmentation data can be merged with the 3D scan volume, e.g., manually or autonomously. In some embodiments, the 3D scan volume can be modified based on the output of the segmentation model, e.g., to take the form of color-coded 3D volumes or labeled 3D volumes (e.g., using different colors, patterns, markings, etc.). In some embodiments, the segmentation data and the image data from the 3D scan volume can be kept separate, and the two can be inputted together into a segmentation model for further processing. For example, the segmentation model (e.g., a neural network or other algorithm) can receive separate 3D scan volume images and segmentation data images and automatically concatenate the two together to produce a processed 3D scan volume of higher dimensionality.

At 650, one or more regions of training data may be defined. In some embodiments, successive multi-dimensional (e.g., 3D) regions of image data can be defined or selected using predefined parameters, such as, for example, the size of the region, the value of the multi-dimensional stride, etc. The multi-dimensional regions of image data can be extracted from the 3D scan volume, which can have the manual and/or autonomous segmentation data. In instances of spine segmentation, each multi-dimensional region of image data can include a volume of each vertebral level with a part of its surrounding tissues including, for example, nervous system components, muscles, vessels, ligaments, intervertebral discs, joints, cerebrospinal fluid, etc. The regions of image data can include (1) information about the voxel distribution along the multi-dimensional axes (e.g., X, Y, and X axes), (2) appearance information about one or more anatomical parts, and (3) segmentation data indicative of the classification of the adjacent anatomical parts.

Optionally, the regions of image data can be resized, at 660, e.g., to achieve a predefined size for training a segmentation model. In some embodiments, the regions of image data can be resized to achieve the same size of all regions of image data. The training dataset can be augmented, at 670). The augmentation of the training dataset can be similar to that described with reference to 430 in FIG. 4A. For example, each multi-dimensional region of image data and its corresponding output multi-dimensional region of image data can be subjected to the same augmentation techniques, e.g., one or more of rotation, translation, scaling, shear, horizontal or vertical flip, multidimensional grid deformations, additive noise of Gaussian and/or Poisson distribution and Gaussian blur, brightness or contrast corrections, etc. These augmentation techniques can remap voxels positions in the multi-dimensional regions and change the appearance of the anatomical structures. Similarly, the manual and/or autonomous segmentation data associated with the multi-dimensional regions of image data can be remapped to match the new anatomical structures' shape. During the augmentation process, the value of each voxel containing information about the anatomical structures' appearance can be recalculated in regard to its new position using an interpolation algorithm (e.g., bicubic, polynomial, spline, nearest neighbor, or any other interpolation algorithm). The augmented regions of image data can be included as part of the training dataset.

At 680, the training dataset can be used to train a segmentation model to identify one or more anatomical parts of interest. The anatomical parts of interest can be different from but adjacent to or near the anatomical parts that were previously segmented at 620. For example, if the adjacent anatomical structure is bony structure of the spine, the anatomical part of interest can be the nerves, intervertebral discs, or other anatomy in the region of the spine. The training of the segmentation model can be similar to that described with reference to 440 in FIG. 4A. For example, the training can include inputting the multi-dimensional regions of image data into the segmentation model, and minimizing differences between an output of the segmentation model and the output regions of image data (including labeling) corresponding to the input regions of image data. In some embodiments, the segmentation model can be a CNN model, and the CNN model can be trained according to the example process depicted in FIG. 4B. In some embodiments, Select- Attend-Transfer (SAT) gates or Generative Adversarial Networks (GAN) can be used to increase a quality of the segmentation model outputs.

While not depicted in FIG. 6, the method 600 can optionally include determining when the segmentation model is sufficiently trained, e.g., by applying a counter to count the number of iterations of the training, and/or by evaluating one or more performance metrics. Such steps are described with reference to FIG. 4A above. At 690, once training of the segmentation model is complete, the segmentation model can be stored, e.g., in a memory (e.g., memory 230), at 690. The stored segmentation model can be used by a compute device (e.g., compute device 110, 210) in an inference process, e.g., to perform segmentation of anatomical parts of interest on new image data of a patient.

FIG. 7 is a flow chart of a method 700 of an inference process using a trained segmentation model, according to some embodiments. The method 700 can be similar to the method 400 described above, but can include steps involving initial segmentation of adjacent anatomical structure and processing of multi-dimensional (e.g., 3D) regions of image data.

The method 700 can include reading, e.g., from a database or memory (e.g., memory 230), a set of images of patient anatomy, at 710. In some embodiments, the images can represent consecutive slices (i.e., 2D images) of 3D anatomical structure, and can be received in the form of a 3D scan volume of images. In some embodiments, image data from different sources (e.g., different imaging device(s) 160) can be merged or combined together to provide more comprehensive image data of patient anatomy. Further details regarding combining image data from different imaging devices is described with reference to FIG. 19. In some embodiments, the image data may include one or more of CT data, MRI data, and X-ray data, combinations thereof, and the like.

Optionally, at 720, anatomical structures adjacent to (e.g., near) an anatomical structure of interest can be segmented using an initial segmentation model. For example, a segmentation model for segmenting bony structure can be used to perform segmentation on the 3D scan volume to identify anatomical parts within the bony structure (e.g., vertebral body, pedicles, transverse processes, lamina, and/or spinous process). While not depicted in FIG. 7, it can be appreciated that the images of the 3D scan volume can be resized or processed (e.g., de-noised) prior to being input into the segmentation for segmenting the adjacent anatomical structures.

The output of the segmentation model can optionally be combined (e.g., merged) with the 3D scan volume, at 730. Combining the 3D scan volume, which provides information about the appearance of the anatomical structures, with the output from the segmentation model of the adjacent anatomical structures can increase the amount of information used in a later inference process for segmenting the anatomical part(s) or structure(s) of interest. Such combination can expand the input data dimensionality, and can ease the segmentation of the anatomical part or structure(s) of interest. A compute device (e.g., compute device 110, 210) can combine the 3D scan volume and the output segmentation data by modifying the input image data based on the output segmentation data (e.g., to take the form of color-coded 3D volumes) and/or by separately introducing the 3D scan volume and the segmentation data into another segmentation model (e.g., neural network) to internally produce within the model the information of higher dimensionality. Additionally or alternatively, segmented adjacent structures that are not within the anatomical part(s) or structure(s) of interest can be excluded from an area of interest before performing a later segmentation of the anatomical part(s) or structure(s) of interest. Such can reduce the computational effort and/or increase the efficiency of the later segmentation of the anatomical part(s) or structure(s) of interest.

At 740, multi-dimensional (e.g., 3D) regions of interest (ROI) in the patient 3D scan volume may be defined based on predefined parameters (e.g., size of the region or the multidimensional stride). In some embodiments, overlapping ROIs can be defined, while in other embodiments, non-overlapping ROIs can be defined. Depending on application requirements and/or size or type of the input image data, the predefined parameters can be adjusted. The number of dimensions of the multi-dimensional ROIs can depend on the amount of information obtained from different sources before performing the segmentation of the anatomical part(s) or structure(s) of interest. For example, 3D information from a medical imaging source (e.g., an imaging device 160) can be combined with other 3D information (e.g., from a segmentation model for segmenting adjacent anatomical parts or structures, from another imaging source, etc.) to produce higher dimensional information (e.g., four-dimensional information) that can be input into a segmentation model for segmenting the anatomical part(s) or structure(s) of interest. In some embodiments, information from medical imaging sources can be collected over time and combined to produce higher dimensional information. In some embodiments, information from different imaging sources (e.g., CT, MRI, X-ray) can be combined to produce higher dimensional information.

Optionally, at 750, the ROIs can be resized such that they have a predefined size suitable for being processed by a segmentation model for segmenting the anatomical part(s) or structure(s) of interest. The segmentation model may have been trained using regions of image data having a predefined size (see 660, FIG. 6, described above), and therefore resizing of the ROIs from the patient 3D scan volume may be necessary for the segmentation model to perform the segmentation of the anatomical part(s) or structure(s) of interest. At 760, the multi-dimensional ROIs can be processed by the trained segmentation model to segment the anatomical part(s) or structure(s) of interest. The compute device can be configured to input the ROIs into the segmentation model such that the segmentation model produces an output that defines or indicates a 3D size and shape of the anatomical part(s) or structure(s) of interest. In some embodiments, multiple segmentation models can be used to process the ROIs to produce segmentation data, which can be combined as described below with reference to 780. For example, a segmentation model for segmenting MRI image data can be used to segment a batch of MRI scans and a different segmentation model for segmenting CT image data can be used to segment a batch of CT scans, and the segmentation data output by these two segmentation models can be combined, as described below.

If there are further batches of image data that have not been processed (770): NO), then the process may return to 710 to read another batch of image data and perform segmentation on the new batch of image data. Alternatively, if all batches of image data have been processed (770): YES), then the process can proceed to 780. At 780, separate segmentation outputs (e.g., obtained on overlapping ROIs) can optionally be combined, e.g., by determining the local overlapping voxels in the 3D segmentation data and combining the segmentation data associated with the voxels. In some embodiments, the compute device can implement a boosting algorithm to combine segmentation data for over-lapping voxels. In some embodiments, the compute device can implement a bootstrap aggregating or bagging algorithm to combine segmentation data for overlapping voxels. In some embodiments, the compute device can implement any number of model averaging approaches, e.g., mean or median functions, etc. By combining multiple segmentation outputs for the same voxel (or group of voxels), with each segmentation output associated with different predicting conditions (e.g., inputs, model weights, parameters, etc.), systems and devices described herein can produce a higher quality segmentation output that more accurately predicts the proper voxel classification.

Optionally, at 782, the segmentation output(s) (e.g., separate or combined segmentation outputs) may be postprocessed, e.g., by filtering with predefined set of filters and/or parameters, for enhancing proper shape, location, size and continuity of the segmented anatomical part(s) or structure(s) of interest. At 784, the segmentation output(s) can be analyzed to identify, for each voxel or group of voxels, the class from the plurality of classes representing the anatomical part(s) or structure(s) of interest. At 790, a 3D anatomical model may be generated based on the identified anatomical part(s) or structure(s) of interest. While not depicted in FIG. 7, the 3D anatomical model can be stored in a memory (e.g., memory 230) and/or used to generate virtual representations of the patient anatomy for visualization (e.g., in a surgical navigation system 170). Such steps are described with reference to 580-590 in FIG. 5.

The segmentation models as described herein can be used to process several different types of image data, including, for example, CT image data, X-ray image data, and MRI image data. The following sections describe examples of segmentation performed on each of these image types.

3. CT Segmentation

As discussed above, CT imaging devices are commonly used to capture images of anatomical structures noninvasively for diagnostic purposes. CT imaging devices use an X-ray source to produce fan-shaped beams that are used to irradiate a section of a patient's body. Detectors within the imaging device can record the X-rays exiting the section of the patient's body being irradiated, and images of thin sections of the patient's body can be acquired. The images can represent successive 2D scans of the patient's body, which can be combined together to provide image data for a 3D volume of the patient's body.

Systems, devices, and methods described herein can be configured to perform segmentation of CT images or scans. For example, a compute device (e.g., compute device 110, 210) can be configured to process one or more CT scans using a segmentation model to classify each pixel (or group of pixels) of the CT scan. Such classification can be used to identify different anatomical part(s) and/or structure(s) of interest.

Figure 8A:
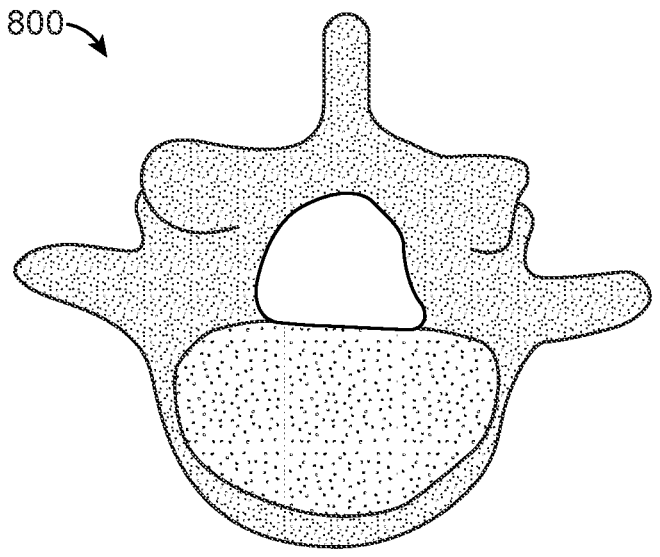
FIG. 8A is an example 2D scan of a spine of a patient, according to some embodiments.

FIG. 8A depicts an example of a CT scan 800 of a spine of a patient. The CT scan 800 can be a de-noised image of the patient anatomy. As described above, a compute device (e.g., 110, 210) can receive raw CT scans of patient anatomy and use a de-noising model (e.g., de-noising model 300) to remove noise from the raw CT scans. In some embodiments, the de-noising model can be a CNN model trained to identify noise that is unique to images produced using certain imaging devices. For example, the CNN model can be tuned to remove noise that is unique to a specific CT imaging system, a specific brand of CT imaging systems, and/or CT imaging systems with specific settings. The CT scan 800 can include a scan of a vertebra of the patient.

Figure 8B:
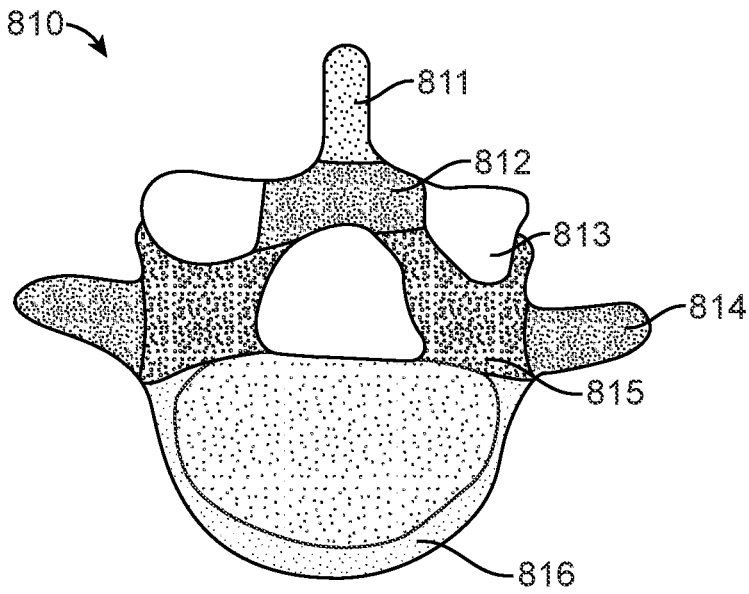
FIG. 8B is an example of a segmentation output of the image of FIG. 8A.
Figure 8C:
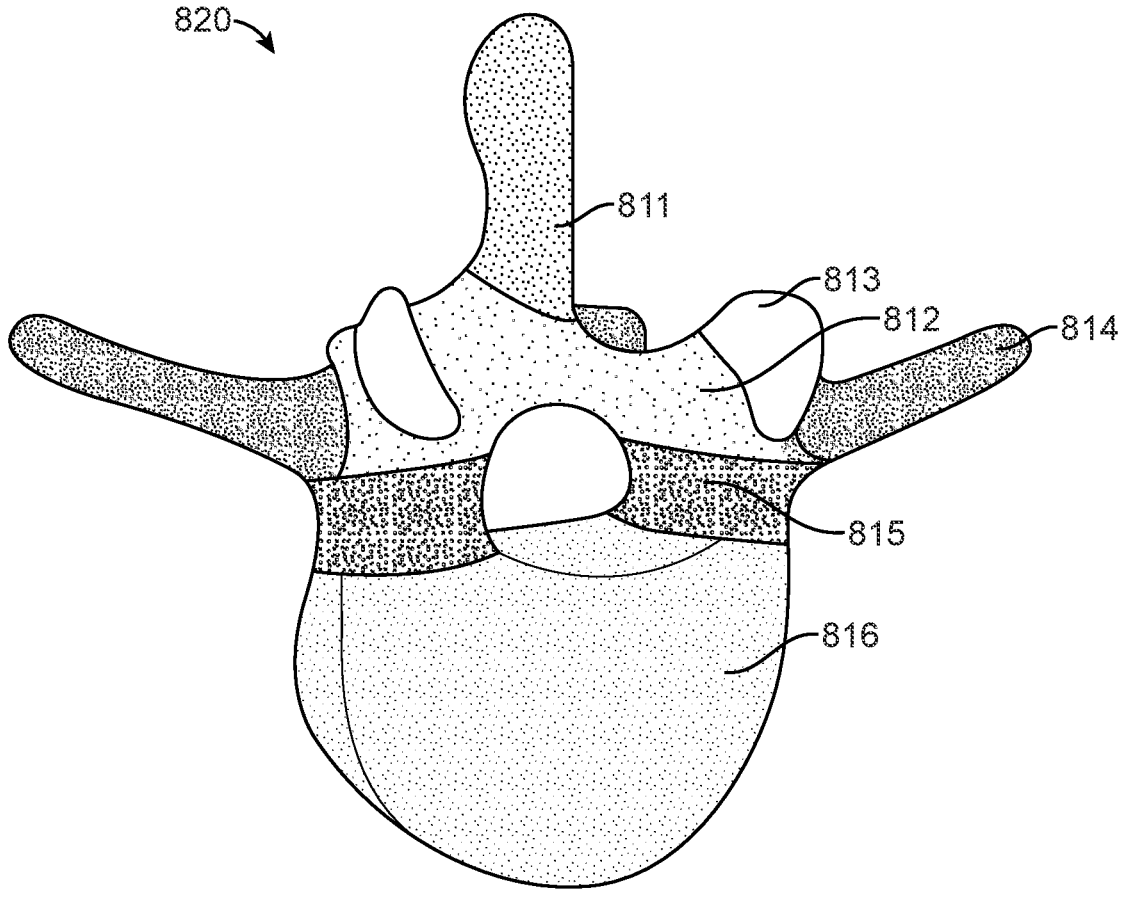
FIG. 8C is a perspective view of a 3D model based on a set of segmented images, including the image of FIG. 8A, according to some embodiments.

The CT scan 800 can be processed using a segmentation model (e.g., segmentation model 350), such as described with reference to FIG. 5, and an output 810 can be produced. The segmentation model can be trained to segment the bony structure of the vertebra into one or more anatomical parts. In particular, the segmentation model can be configured to classify each pixel or group of pixels of the CT scan 800 into one of a plurality of classes. The plurality of classes can be associated with a plurality of anatomical parts, including, for example, a spinous process 811, lamina 812, articular process 813, transverse process 814, pedicles 815, and/or vertebral body 816. As depicted in FIG. 8B, the output 810 of the segmentation model can include the different anatomical parts denoted using different visual characteristics (e.g., different colors, patterns, or other characteristics).

In some embodiments, the CT scan 800 can be part of a 3D scan volume of a 3D region of a patient's anatomical structure. For example, the CT scan 800 can be part of a 3D scan volume of an entire vertebra. The CT scans of the vertebra can be processed using a segmentation model (e.g., segmentation model 350) trained to identify different anatomical parts of the vertebra. The output of the segmentation model can be used to generate a 3D model 820 of the vertebra, including the segmentation information of the different anatomical parts. Further details of segmenting 3D image data and generating a 3D anatomical model are described with reference to FIG. 5.

Figure 9A:
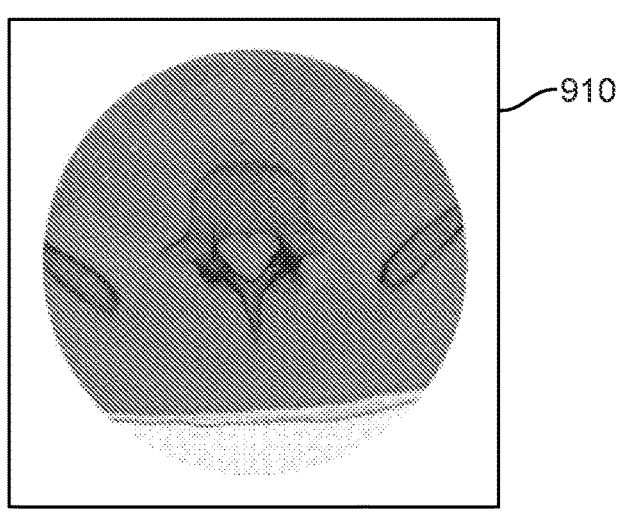
FIG. 9A is an example 2D scan of a spine of a patient, according to embodiments.
Figure 9B:
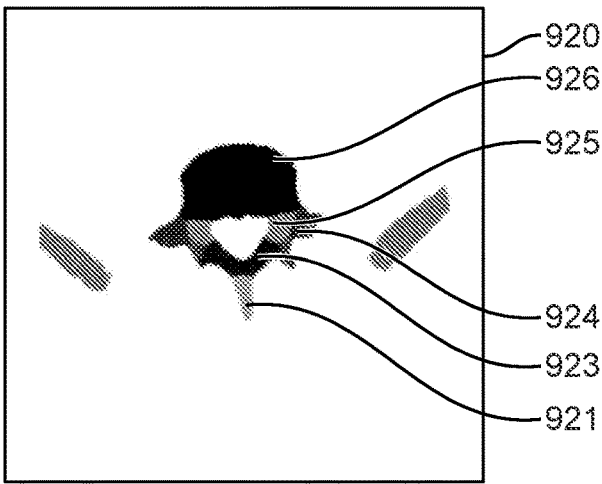
FIG. 9B is an example of a segmentation output of the image of FIG. 9A.

In some embodiments, a 3D scan volume including a series of CT scans can first be segmented using a first segmentation model to identify adjacent anatomical part(s) and/or structure(s), and then be combined with the output of the segmentation model to increase information that is provided to a second segmentation model, e.g., for training or for inference purposes. Such processes are described with reference to FIGS. 6 and 7. For example, FIG. 9A depicts an example CT scan 910, which represents a slice of a region around a spine of a patient. The CT scan 910 can belong to a 3D scan volume of an area around the spine of the patient. A compute device (e.g., compute device 110, 210) can read a set of images, including the CT scan 910. The compute device can perform initial segmentation on the set of images, e.g., using a trained segmentation model for segmenting adjacent anatomical part(s) and/or structure(s), and obtain an output for each image from the set of images. FIG. 9B depicts an example of such an output (output 920) for the CT scan 910.

The adjacent anatomical part(s) and/or structure(s) can represent those part(s) and/or structure(s) that are adjacent to (e.g., near) one or more anatomical part(s) and/or structure(s) of interest. For example, in some instances, the anatomical structure(s) of interest can include soft tissue structures such as nerves, intervertebral discs, muscles, etc., while the adjacent anatomical structure can include the bony structure adjacent to the nerves, intervertebral discs, muscles, etc. Accordingly, a first segmentation model trained to segment the bony structure can be used to process each image from the set of images (including, for example, CT scan 910) and to produce an output for each image (including, for example, output 920 corresponding to the CT scan 910) from the set of images that denotes separate areas corresponding to different parts of the bony structure. As depicted in FIG. 9B, the output 920 corresponding to the CT scan 910 can include different coloring, patterns, marking, or other visual characteristics denoting the different parts of the bone structure, such as, for example, the vertebral body 926, pedicles 925, transverse processes 924, lamina 923, and/or spinous process 921.

Figure 9C:
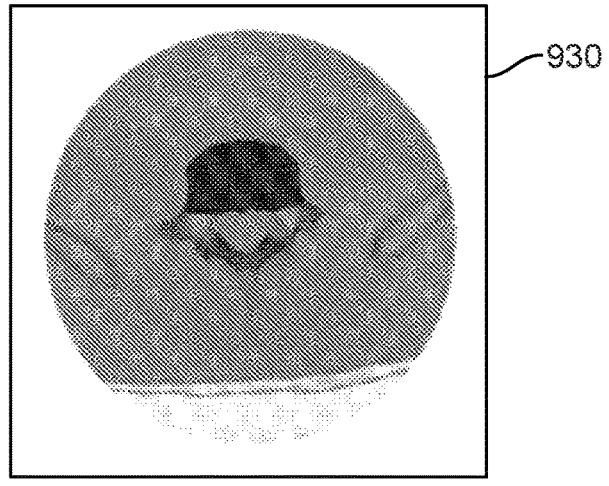
FIG. 9C is an example of combined image data and segmentation output of the image of FIG. 9A.

In some embodiments, the information from the CT scan 910 and the segmentation data from the output 920 of the segmentation model can be combined (e.g., merged) into an example image 930, as depicted in FIG. 9C. The merged image 930 can be in the form of a color-coded CT scan (DICOM) image or coded CT scan image based on other visual characteristics (e.g., patterns, markings, etc.). Further details of merging the CT image data and the segmentation data are described with reference to methods 600 and 700, at 630 and 730, respectively. The merged image 930 can then be used in a training process or an inference process, as described in FIGS. 6 and 7. In some embodiments, the CT scan 910 and the output 920 can be kept as separate images, which can be input together into a later segmentation model, which can use information from both the CT scan 910 and the output 920 for training of inference.

Figures 10A, 10B:
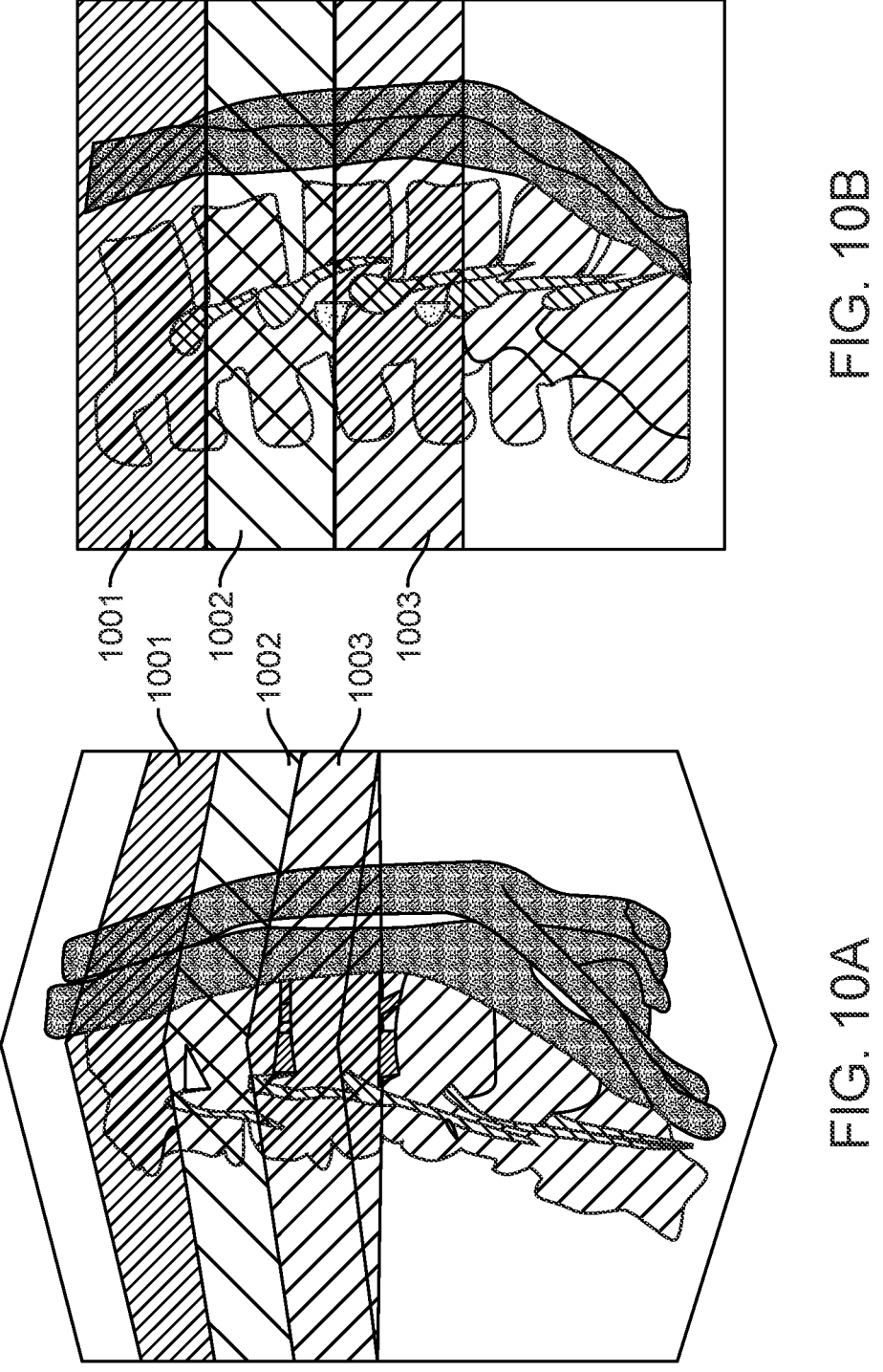
FIGS. 10A-10B are views of multidimensional regions selected from a multidimensional data of patient anatomy, according to some embodiments.
Figures 11A, 11B:
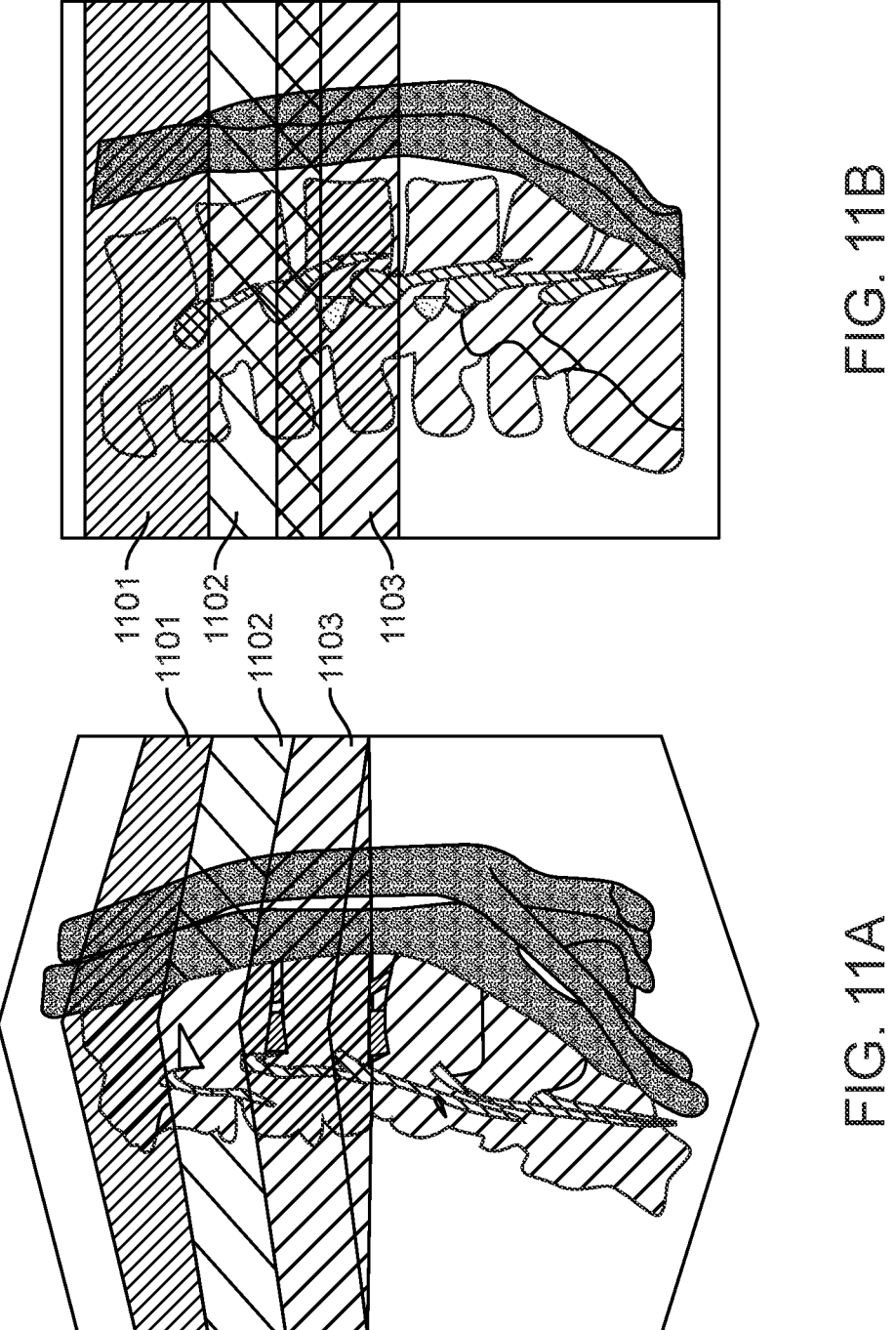
FIGS. 11A-11B are views of multidimensional regions selected from a multidimensional data of patient anatomy, according to some embodiments.

In some embodiments, a plurality of multi-dimensional regions of image data can be defined in 3D image data, e.g., captured using a CT imaging system (or other imaging system). The multi-dimensional regions of image data can be used in a training process or an inference process, as described in FIGS. 6 and 7. For example, the multi-dimensional regions of image data can be input into a segmentation model and processed using the segmentation model to identify one or more anatomical part(s) and/or structure(s) of interest. The multi-dimensional regions of image data can include information taken from CT scans include in a 3D scan volume and/or segmentation data output by a segmentation model trained to identify adjacent anatomical part(s) and/or structure(s) to the anatomical part(s) and/or structure(s) of interest. In some embodiments, the multi-dimensional regions of image data can be successively defined next to one another without overlap, as depicted in FIGS. 10A and 10B with regions 1001, 1002, 1003. In some embodiments, the multi-dimensional regions of image data can be defined with overlapping portions, as depicted in FIGS. 11A and 11B with regions 1101, 1102, 1103. The size of each region and the multi-dimensional stride can determine whether or not the regions of image data overlap. For example, in FIGS. 10A and 10B, the stride is equal to one dimension of the regions of image data, and therefore the regions 1001, 1002, 1003 do not overlap. Alternatively, in FIGS. 11A and 11B, the stride is less than one dimension of the regions of image data, and therefore the regions 1101, 1102, 1103 overlap their adjacent regions.

In some embodiments, a plurality of multi-dimensional regions can be passed to the input layer of a segmentation model to perform a training process or an inference process, as described with reference to FIGS. 6 and 7.

In some embodiments, the segmented CT images can be used to generate a 3D model of the patient anatomy, which can be used to selectively visualize different parts of the patient anatomy. In some embodiments, segmented CT image data may be processed to analyze one or more characteristics of a patient's anatomical structures. For example, segmented anatomy may be analyzed to perform identification (e.g., level identification of different levels of the spine), geometric measurements and/or evaluations, and/or dimensional measurements and/or evaluations.

4. X-Ray Segmentation

X-ray imaging can provide detailed information about bony structure within patient anatomy. For example, X-ray imaging can be used to analyze the spine, including performing measurements of various bone structures within the spine. Traditionally, X-ray images are interpreted by radiologists. A radiologists can interpret the scans to evaluate specific areas of the spine (e.g., cervical, thoracic, lumbar, etc.). These evaluations can vary, e.g., depending on the expertise of a particular radiologist and their subjective analysis of the X-ray images. In contrast, systems, devices, and methods described herein can provide an autonomous method for extracting information regarding different portions of the spine (or other patient anatomy) from X-ray images. For example, as described above, a compute device (e.g., compute device 110, 210) can use one or more segmentation models to process X-ray images to segment different portions of the images (e.g., to classify each pixel or group of pixels of the images into one of a plurality of classes corresponding to different anatomical parts).

Systems, devices, and methods described herein can also be adapted to process large batches of X-ray images, thereby providing a more efficient and robust method of evaluating information contained in X-ray images. In some embodiments, X-ray images can be combined with other types of images (e.g., CT scans, MRI scans) to produce higher-dimensional data, which can result in more accurate segmentation and/or identification of different anatomical parts within the patient anatomy. Systems, devices, and methods described herein can be designed to speed up diagnostic processes and decrease the risk of human error and/or subjectivity.

As described above with reference to FIG. 5, a compute device (e.g., compute device 110, 210) can be configured to perform segmentation from 2D X-ray imaging. In contrast to other types of imaging data, where volumetric 3D image data may be available in a series of scans, X-ray images provide volumetric information of human anatomy in a flattened 2D image. Accordingly, a segmentation model configured to segment X-ray images must be adapted to determine multiple overlapping tissues for each pixel of the X-ray image.

A segmentation model for segmenting X-ray images can be trained using input images that include flattened 3D image data. In some embodiments, the training can be conducted using X-ray images of patient anatomy, where each X-ray image is associated with a multi-dimensional label map. The multi-dimensional label map can identify different, overlapping anatomical parts within the X-ray images. In some embodiments, the training can be conducted using digitally reconstructed or digitally generated X-ray images, where each reconstructed X-ray image can be associated with a multi-dimensional label map. The reconstructed X-ray images may correspond to, for example, one or more of a sagittal view and coronal view.

Figure 12:
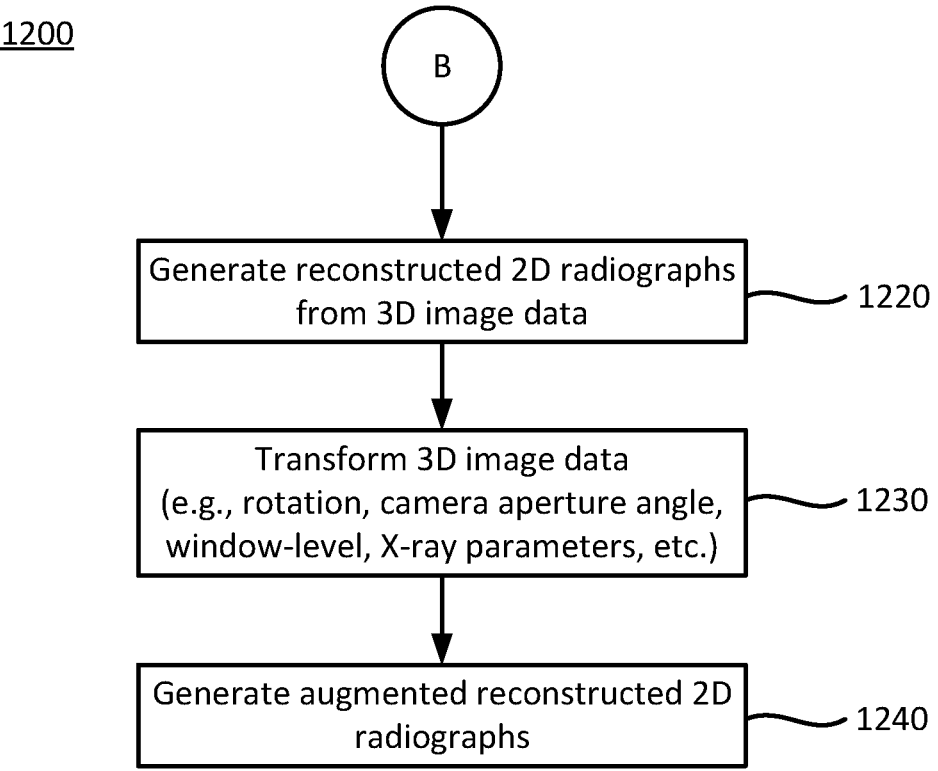
FIG. 12 is a flow chart illustrating a process for generating training data for an X-ray segmentation model, according to some embodiments.

FIG. 12 is a flow chart of a method 1200 of generating training images for training an X-ray segmentation model. The method 1200 may include generating digitally reconstructed 2D X-ray images or radiographs from 3D image data, e.g., captured using CT imaging and/or MRI imaging, at 1220. For example, 3D volumetric CT scans may be flattened to form a digitally reconstructed 2D radiograph (e.g., artificial X-ray) that includes overlapping tissues. In some embodiments, one or more of sagittal and coronal digitally reconstructed 2D radiographs may be generated from a set of 3D scan volumes. The reconstructed 2D radiograph can be associated with a multi-dimensional label map that applies labels to the different overlapping tissues.

Figures 13A, 13B:
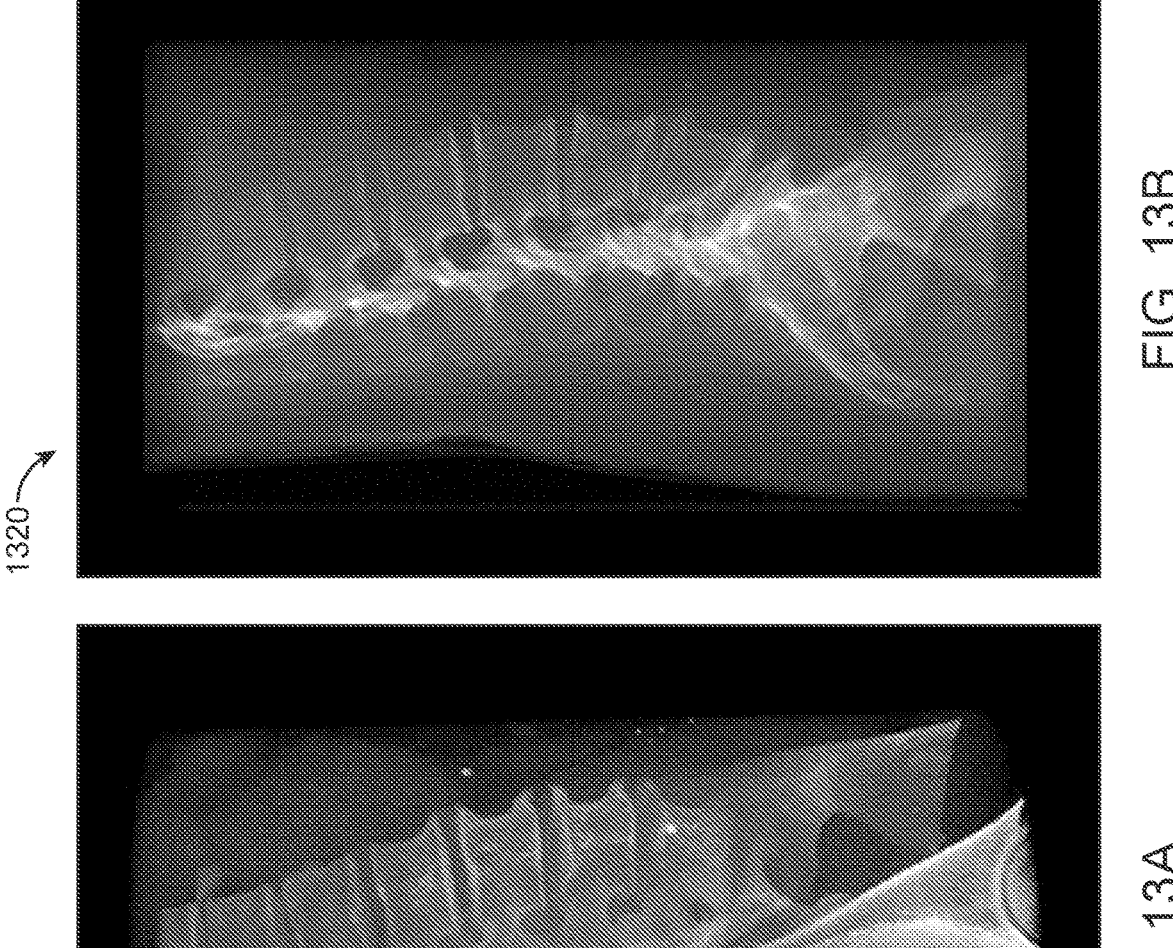
FIG. 13A is 3D volume image data of patient anatomy, according to some embodiments.
FIG. 13B is a digital reconstruction of a 2D radiograph based on the 3D volume image data of FIG. 13A, according to some embodiments.

For illustrative purposes, FIG. 13A depicts an example of a 3D image 1310 of patient anatomy. The 3D image 1310 can represent a 3D CT image rendered using ray casting from a set of 2D (DICOM) CT scans. In some embodiments, the information within the 3D image 1310 can be average along a selected axis to create a digitally reconstructed 2D mean image. In some embodiments, a compute device can employ ray casting (e.g., with additive or average projection) to combine information from the 3D volume in an orthogonal manner, but to simulate X-ray image distortion. A traditional X-ray is generated from a source point that beans rays across tissues to an X-ray reception plate. The effect from the source point to the plate can be emulated by ray casting. Such technique can provide more representative or accurate digitally reconstructed 2D radiographs for training a segmentation model. FIG. 13B depicts an example of reconstructed 2D radiograph 1320, generated using the 3D image 1310 of FIG. 13A. The digitally reconstructed 2D radiograph 1320 may correspond to a flattened version of 3D image 1310, e.g., averaged along a selected axis.

Figure 14:
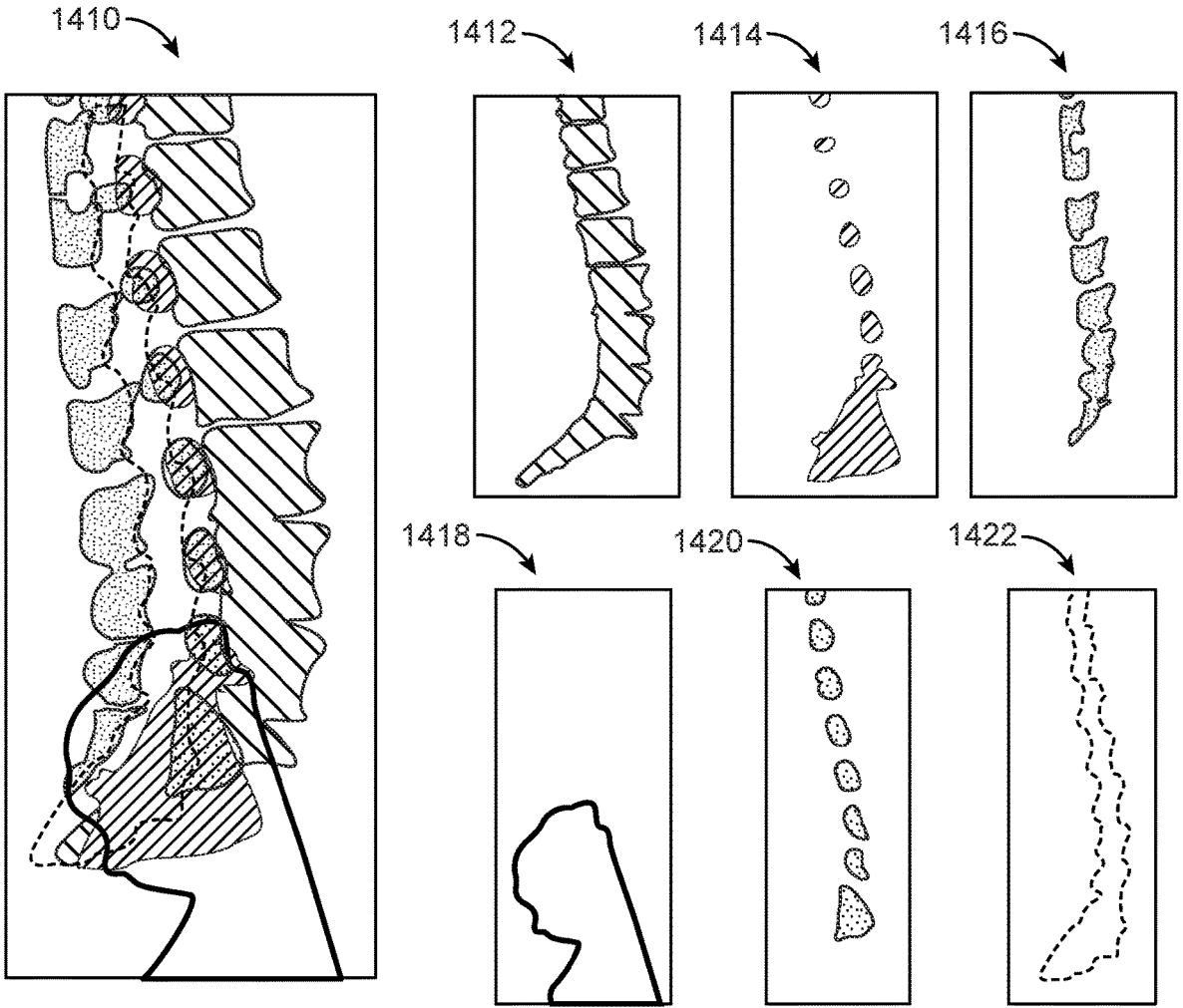
FIG. 14A depicts labels associated with the 2D radiograph of FIG. 13B, according to some embodiments.

The reconstructed 2D radiograph 1320 can be associated with a multi-dimensional label map. A compute device, for example, can generate a multi-dimensional label map based on information provided in the 3D image volume. FIG. 14 depicts an example of a multi-dimensional label map 1410 corresponding to the 2D radiograph 1320 depicted in FIG. 13B. The multi-dimensional label map 1410 can include a plurality of labels 1412-1422, each associated with a different anatomical part within the patient anatomy. Each label 1412-1422 can be provided in a separate 2D image (e.g., array). Each label 1412-1422 may include one or more of the name, location, dimension, and timestamp of the anatomical part.

Referring back to FIG. 12, the training data can be augmented, e.g., by transforming 3D image data, at 1230), and using the transformed 3D image data to generate additional reconstructed 2D radiographs, at 1240. For example, the 3D volumetric CT image data can be transformed using one or more augmentation techniques, e.g., to simulate different rotations, postures, orientations, and the like. The augmentation techniques can include volumetric modification techniques such as, for example, rotation, camera aperture angle, window-level correction, X-ray parameters, transition, share, scaling, brightness and contrast correction, gamma correction, combinations thereof, and the like.

At 1240, the compute device can use the transformed or augmented 3D image data to generate additional digitally reconstructed 2D radiographs. FIGS. 15A and 15B provide examples of different digitally reconstructed 2D radiographs. FIG. 15A is a digitally reconstructed 2D radiograph 1510 that is generated based on original 3D image data, and FIG. 15B is a digitally reconstructed 2D radiograph 1520 that is generated based on transformed 3D image data. In particular, the 3D image data used to generate the 2D radiograph 1520 was transformed by rotating the original 3D image data by a set angle.

The reconstructed 2D radiographs, e.g., reconstructed at 1220 and/or 1240, can be used alone or together with X-ray images to train a segmentation model to segment X-ray images, as described with reference to FIGS. 4A and 4B. For example, the reconstructed 2D radiographs and/or X-ray images can be input into a segmentation model and processed by the segmentation model to generate outputs, at 440 of FIG. 4A. The outputs can be compared to the multi-dimensional label maps associated with the input images (representative of the desired output), e.g., using an objective function or loss function. And one or more weights or parameters within the segmentation model can be adjusted to reduce the value of the loss function in a subsequent iteration of the training. In some embodiments, one or more of the reconstructed 2D radiographs and multi-dimensional label maps may be used to train a segmentation CNN model, as described with reference to FIG. 4B.

In some embodiments, a segmentation model trained to segment X-ray images can be used to produce a segmentation output 1620, as depicted in FIG. 16B. FIG. 16A provides an example of a 2D X-ray 1610 of a spine of a patient. The 2D X-ray 1610 can be input into a segmentation model trained to process X-ray images, and processed using the segmentation model to produce an output 1620 that provides overlapping tissue segmentation. The output 1620, for example, can include multiple 2D arrays or images each associated with a different anatomical part. The 2D arrays can overlap one another, providing overlapping tissue segmentation from the X-ray image.

Figures 17A, 17B:
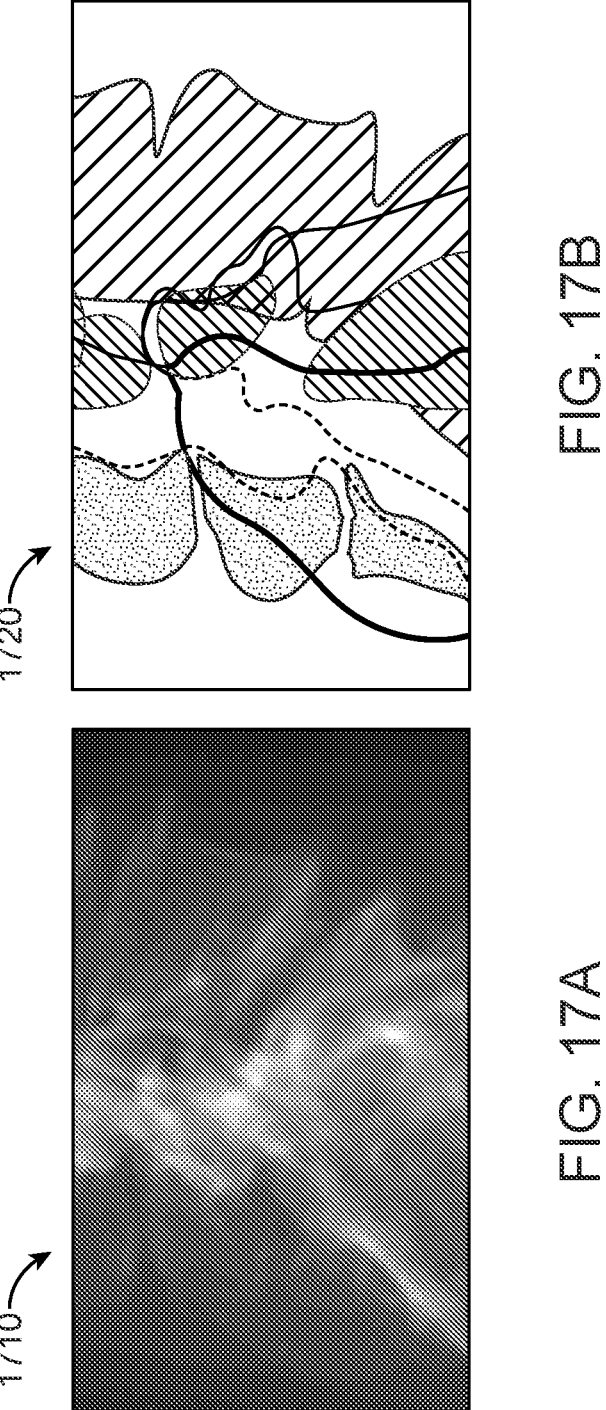
FIG. 17A is an image of an X-ray with anatomical parts that are difficult to visually discern, according to some embodiments.
FIG. 17B is an image of a segmentation output of the X-ray of FIG. 17A identifying the anatomical parts, according to some embodiments.

Segmentation models described herein can be trained using 3D volume image data, and therefore can be configured to segment parts of anatomical structure that may not be recognizable by visually examining the 2D X-rays. For example, FIG. 17A is an example X-ray image 1710 with overlapping anatomical parts that may be difficult for a human to visually discern. A segmentation model trained using 3D image data, however, can be configured to extract shape and other characteristics of overlapping tissues from the pixels of the 2D X-ray 1710 to be able to segment the different anatomical parts within the 2D X-ray 1710. The segmentation model can then return an output 1720, as depicted in FIG. 17B, where multiple overlapping labels are applied to the 2D X-ray 1710. Training a segmentation model with a large number of labeled X-rays, including those generated from multi-dimensional image data, can increase the labeling quality in comparison to a human analyst.

In some embodiments, a segmentation model used to segment X-ray images can be a CNN model, such as that described with reference to FIG. 3B. The CNN model can have a U-Net architecture. Generally, when performing segmentation using a CNN, the CNN contains a single output layer with an activation function (e.g., Softmax activation function), which can be sufficient for providing a single result (i.e., a single label) for each pixel or voxel within the image data. For example, when segmenting 2D scans of patient anatomy and/or 3D image data, there can be multiple classes or labels (e.g., vertebral body, pedicles, lamina, etc.) and each pixel or voxel in the image data can be associated with a single value representative of one of the multiple labels. In contrast, when segmenting X-ray images, a single pixel within the X-ray image can represent multiple overlapping tissues. As such, the CNN model trained to segment X-ray images must be configured to define an output for each pixel of the X-ray image and to determine a probability for each pixel belonging to each of multiple classes separately. In some embodiments, the same CNN architecture (e.g., as depicted in FIG. 3B) can be used to classify X-ray images, but the activation function can be changed from Softmax to, for example, linear or sigmoid. Such a model can require additional post-processing of the segmentation output, e.g., to determine the threshold for the CNN probability, above which it can be determined that the predicted label is correct. For example, for each pixel of an X-ray image, each label or class that has a probability of greater than a predefined threshold (e.g., about 50%) can be determined to be correct and therefore associated with that pixel. In some embodiments, a different CNN architecture that includes multiple output layers (e.g., one layer for each label or class), with a Softmax activation function, can be used. The CNN model can then determine via the multiple output layers whether to assign a label to a particular pixel of the 2D X-ray image. The CNN model can be differentiating, for each label separately, whether a current pixel belongs to that label.

In some embodiments, the segmented X-ray images can be used to generate a 3D model of the patient anatomy, which can be used to selectively visualize different parts of the patient anatomy. In some embodiments, segmented X-ray image data may be processed to analyze one or more characteristics of a patient's anatomical structures. For example, segmented anatomy may be analyzed to perform identification (e.g., level identification of different levels of the spine), geometric measurements and/or evaluations, and/or dimensional measurements and/or evaluations.

5. MRI Segmentation

MRI image data can include 2D scans of patient anatomy, typically along multiple planes, such as, for example, an axial plane and a sagittal plane. Segmentation and labeling of MRI images can be similar to the methods described with reference to FIGS. 5 and 7, but incorporate segmentation along multiple planes (e.g., the axial plane and sagittal plane).

In some embodiments, segmentation of MRI images can include segmentation into a larger number of classes than CT images, X-ray images, etc. MRI images can include information regarding soft tissues and therefore provide more information for classifying and/or labeling pixels within the MRI images. In an example implementation, an MRI segmentation model can classify each pixel (or group of pixels) within an MRI image into one of sixteen (15) classes: [1] Vertebral body (spine), [2] Pedicle (spine), [3] Spinous process (spine), [4] Transverse process (spine), [5] Superior articular process (spine), [6] Inferior articular process (spine), [7] Lamina (spine), [8] Pelvis, [9] Ribs, Spinal cord (nerves), Spinal nerves (nerves), Fat (nerves), Ligamentum (nerves), Annulus (intervertebral disc) and Nucleus (intervertebral disc).

Figures 18C, 18D, 18E, 18F:
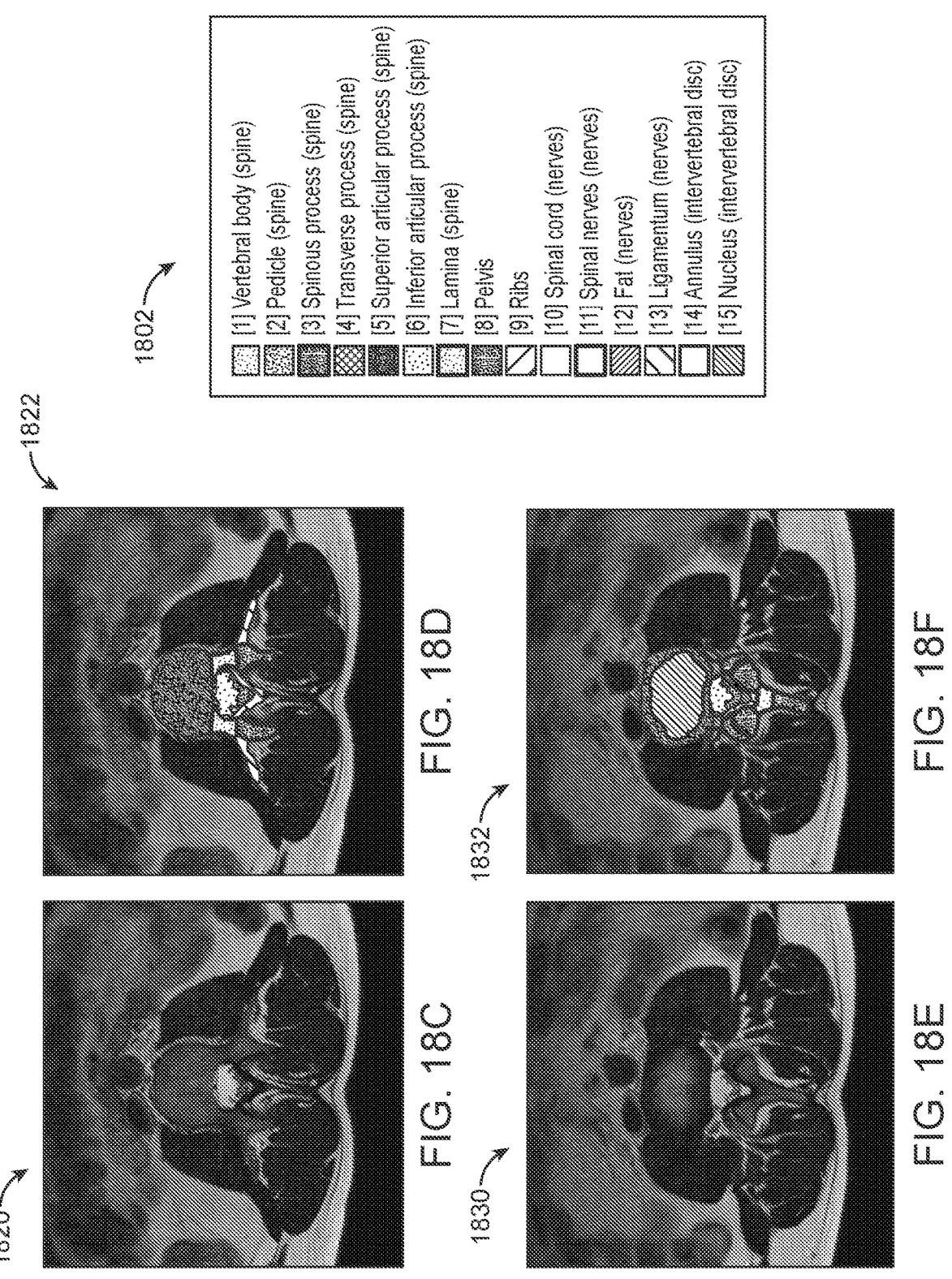

FIGS. 18A-18F provide examples of MRI images and their segmentation outputs. As depicted, the segmentation outputs can include a plurality of classes, as detailed in legend 1802. FIGS. 18A, 18C, and 18E are images of patient anatomy produced using MRI imaging. FIGS. 18B, 18D, and 18F are images of labeled anatomical parts corresponding to the MRI images of FIGS. 18A, 18C, and 18E, respectively.

FIG. 18A depicts a sagittal plane MRI image 1810 that can be processed using a segmentation model (e.g., model 350), and FIG. 18B depicts the output 1812 generated by the segmentation model in response to processing the MRI image 1810. The output 1812 can be a labeled sagittal plane image 1812, with different coloring, shading, patterns, markings, or other characteristics depicting different anatomical parts within the patient anatomy. FIGS. 18C and 18E depict axial plane MRI images 1820, 1830 that can be processed using a segmentation model, and FIGS. 18D and 18F depict the outputs 1822, 1832 generated by the segmentation model in response to processing the images 1820, 1830, respectively.

In some embodiments, a segmentation model used to segment MRI images can be a CNN model that uses a U-Net architecture, such as that described with reference to FIG. 3B. In some embodiments, the CNN model can be configured to process two planes of image data (e.g., sagittal and axial) simultaneously. Generally, when performing segmentation using a CNN, the CNN takes as inputs slices of image data in a single plane (e.g., an axial plane). MRI image data, however, typically includes different scans including view in multiple planes (e.g., axial and sagittal). Accordingly, to process MRI image data, it can be desirable to use a CNN model that can process images along multiple planes simultaneously. In an embodiment, the CNN model can include multiple output layers, a first for axial plane images and a second for sagittal plane images. In such embodiment, if an input image is axial, then the CNN model can produce a result on the first output layer, and if the input image is sagittal, the network can produce a result on the second output layer. Such approach can provide segmentation data but also provide information regarding the plane of the input image.

In some embodiments, the segmented MRI images can be used to generate a 3D model of the patient anatomy, which can be used to selectively visualize different parts of the patient anatomy. MRI image scans of a 3D volume, however, are oftentimes separated by a distance of about 5 mm or greater. Such separation can make it difficult to generate 3D models of anatomical structures for visualization. Accordingly, in some embodiments, MRI image data can be combined with other sources of image data (e.g., CT scans or X-ray scans) to generate a 3D model of the patient anatomy.

In some embodiments, segmented MRI image data may be processed to analyze one or more characteristics of a patient's anatomical structures. For example, segmented anatomy may be analyzed to perform identification (e.g., level identification of different levels of the spine), geometric measurements and/or evaluations, and/or dimensional measurements and/or evaluations.

6. Combined Segmentation

Figure 19:
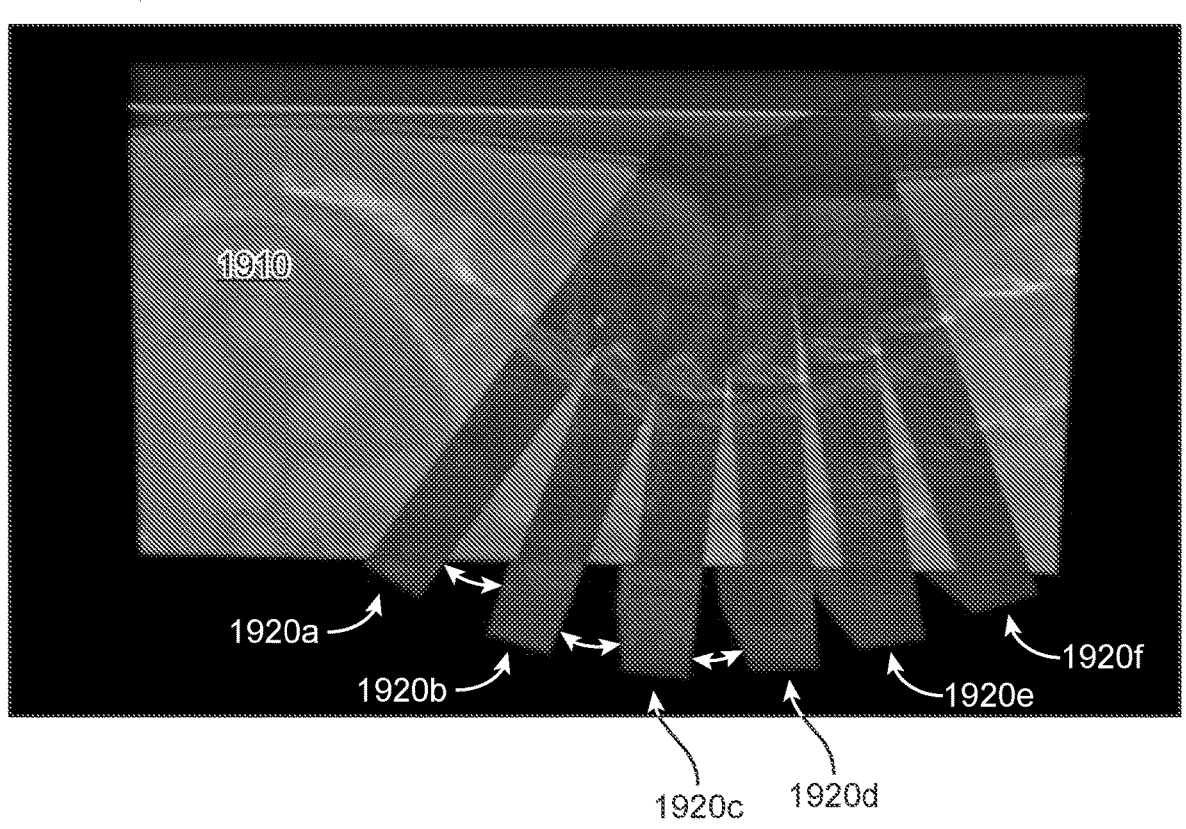
FIG. 19 is an example rendering of combined MRI and CT image data of patient anatomy, according to some embodiments.

In some embodiments, image data produced using a plurality of different imaging techniques may be combined to generate 3D anatomical data and/or segmentation data. CT image data, for example, can be denser than MRI image data. In particular a distance between CT slices maybe smaller than that for MRI slices of a 3D anatomical structure. As such, in some embodiments, gaps in MRI image data can be filled in using CT image data. For example, FIG. 19 depicts an example rendering 1900 of combined MRI and CT image data of patient anatomy. The image 1900 may include a CT sagittal projection 1910 combined with a plurality of axial plane MRI images 1920a-1920f. A compute device (e.g., compute device 110, 210) can be configured to generate a 3D model of the anatomical structure (e.g., spine) using the dense CT image data 1910 and the MRI image data 1920a-1920f.

7. Disc Segmentation

In some embodiments, systems, devices, and methods described herein can be configured to segment intervertebral discs. As described above, segmentation models for segmenting patient anatomy can be configured to classify or label portions of images as one or more anatomical parts. In some embodiments, the anatomical parts of interest can include intervertebral discs.

Figures 20A, 20B:
FIGS. 20A-20B are images showing segmentation of intervertebral discs on a 2D image of patient anatomy, according to some embodiments.

FIG. 20A is a 2D image 2010 (e.g., a CT or MRI scan) on an axial plane of patient anatomy, including a vertebral disc. A compute device (e.g., compute device 110, 210) can use a segmentation model, such as any of the segmentation models described herein (including, for example, that described with reference to FIG. 5), to identify a shape of the intervertebral disc 2022. The segmentation model can generate an output 2020 that identifies the intervertebral disc 2022, e.g., in a different color, pattern, marking, etc.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto: inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which examples have been provided. The acts performed as part of the methods may be ordered in any suitable way. Accordingly, embodiments may be constructed in which acts are performed in an order different than illustrated, which may include performing some acts simultaneously, even though shown as sequential acts in illustrative embodiments.

As used herein, the terms "about" and/or "approximately" when used in conjunction with numerical values and/or ranges generally refer to those numerical values and/or ranges near to a recited numerical value and/or range. In some instances, the terms "about" and "approximately." may mean within +10% of the recited value. For example, in some instances, "about 100 [units]" may mean within +10% of 100 (e.g., from 90 to 110). The terms "about" and "approximately" may be used interchangeably.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

Some embodiments and/or methods described herein can be performed by a different software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A method, comprising:
receiving a three-dimensional (3D) scan volume including a set of Magnetic Resonance Imaging (MRI) images of a 3D region of patient anatomy, the 3D region of patient anatomy including a set of anatomical structures, the MRI images including images in a first anatomical plane and images in a second anatomical plane different from the first anatomical plane;
processing the set of MRI images using a segmentation model in which the segmentation model receives the set of MRI images as inputs and processes the images in the first and second anatomical planes;
generating a segmentation output in response to processing the set of MRI images using the segmentation model;
combining the three-dimensional scan volume with the segmentation output to generate information of higher dimensionality of the set of anatomical structures; and
generating a 3D anatomical model that identifies one or more anatomical parts of interest in the 3D scan volume based on the segmentation output and the information of higher dimensionality.

2. The method of claim 1, wherein the first anatomical plane is a sagittal plane and the second anatomical plane is an axial plane.

3. The method of claim 1, further comprising visualizing the segmentation output.

4. The method of claim 1, wherein the one or more anatomical parts of interest include an intervertebral disc.

5. The method of claim 1, wherein the segmentation model is trained using a training dataset, the training dataset including MRI images in the first anatomical plane and MRI images in the second anatomical plane.

6. The method of claim 1, wherein the segmentation model includes a convolutional neural network (CNN).

7. The method of claim 1, the method further comprising prior to processing the set of MRI images, denoising the set of MRI images using the segmentation model.

8. The method of claim 1, wherein generating the segmentation output includes: for at least one pixel in an MRI image in the set of MRI images:
determining a probability that the at least one pixel belongs to a first class of a plurality of classes; and
classifying the at least one pixel into the first class based on the probability.

9. The method of claim 1, further comprising visualizing the 3D anatomical model.

10. The method of claim 1, wherein generating the 3D anatomical model that identifies one or more anatomical parts of interest comprises assigning a label characterizing one or more of the anatomical parts of interest.

11. An apparatus, comprising:
a computer-readable memory; and
a processor operatively coupled to the computer-readable memory storing instructions, that when executed, cause the processor to:
receive a three-dimensional (3D) scan volume including a set of Magnetic Resonance Imaging (MRI) images of a 3D region of patient anatomy, the 3D region of patient anatomy including a set of anatomical structures, the MRI images including images in a first anatomical plane and images in a second anatomical plane different from the first anatomical plane;

process the set of MRI images using a segmentation model in which the segmentation model receives the set of MRI images as inputs and processes the images in the first and second anatomical planes;

generate a segmentation output in response to processing the set of MRI images using the segmentation model;

combine the three-dimensional scan volume with the segmentation output to generate information of higher dimensionality of the set of anatomical structures; and generate a 3D anatomical model that identifies one or more anatomical parts of interest in the 3D scan volume based on the segmentation output and the information of higher dimensionality.

12. The apparatus of claim 11, wherein the first anatomical plane is a sagittal plane and the second anatomical plane is an axial plane.

13. The apparatus of claim 11, further comprising visualizing the segmentation output.

14. The apparatus of claim 11, wherein the one or more anatomical parts of interest include an intervertebral disc.

15. The apparatus of claim 11, wherein the segmentation model is trained using a training dataset, the training dataset including MRI images in the first anatomical plane and MRI images in the second anatomical plane.

16. The apparatus of claim 11, wherein the segmentation model includes a convolutional neural network (CNN).

17. The apparatus of claim 11, the processor is further configured to prior to processing the set of MRI images, denoise the set of MRI images using the segmentation model.

18. The apparatus of claim 11, wherein the processor is further configured to:

for at least one pixel in an MRI image in the set of MRI images:

determine a probability that the at least one pixel belongs to a first class of a plurality of classes; and classify the at least one pixel into the first class based on the probability.

19. The apparatus of claim 11, wherein generating the 3D anatomical model that identifies one or more anatomical parts of interest comprises assigning a label characterizing one or more of the anatomical parts of interest.

20. The apparatus of claim 11, wherein the processor is further configured to visualize the 3D anatomical model.

\* \* \* \* \*